US010645098B2

(12) United States Patent
Ikuse et al.

(10) Patent No.: US 10,645,098 B2
(45) Date of Patent: May 5, 2020

(54) MALWARE ANALYSIS SYSTEM, MALWARE ANALYSIS METHOD, AND MALWARE ANALYSIS PROGRAM

(71) Applicant: NIPPON TELEGRAPH AND TELEPHONE CORPORATION, Chiyoda-ku (JP)

(72) Inventors: Tomonori Ikuse, Tokyo (JP); Kazufumi Aoki, Tokyo (JP); Takeo Hariu, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 163 days.

(21) Appl. No.: 15/546,201

(22) PCT Filed: Dec. 15, 2015

(86) PCT No.: PCT/JP2015/085104
§ 371 (c)(1),
(2) Date: Jul. 25, 2017

(87) PCT Pub. No.: WO2016/121255
PCT Pub. Date: Aug. 4, 2016

(65) Prior Publication Data
US 2018/0020012 A1  Jan. 18, 2018

(30) Foreign Application Priority Data
Jan. 28, 2015  (JP) .................................. 2015-014053

(51) Int. Cl.
*G06F 11/00* (2006.01)
*G06F 12/14* (2006.01)
(Continued)

(52) U.S. Cl.
CPC .......... *H04L 63/1416* (2013.01); *G06F 21/53* (2013.01); *G06F 21/56* (2013.01); *H04L 63/145* (2013.01)

(58) Field of Classification Search
CPC ... H04L 63/1416; H04L 63/145; G06F 21/56; G06F 21/53
See application file for complete search history.

(56) References Cited

U.S. PATENT DOCUMENTS 8,966,625 B1 * 2/2015 Zuk ........................ H04L 63/145
709/227
9,178,900 B1 * 11/2015 Li .......................... H04L 63/145
(Continued)

FOREIGN PATENT DOCUMENTS

CN  102708309 A  10/2012
CN  103164653 A  6/2013
(Continued)

OTHER PUBLICATIONS

"Matthew Ping Bander Alsulami, Spiros Mancoridis, On the effectiveness of application characteristics in the automatic classification of malware on smartphones, Oct. 18-21, 2016, IEEE, INSPEC#16777140" (Year: 2016).*
(Continued)

*Primary Examiner* — Phy Anh T Vu
(74) *Attorney, Agent, or Firm* — Oblon, McClelland, Maier & Neustadt, L.L.P.

(57) ABSTRACT

A malware analysis system includes a preliminary analysis unit, a determination unit, and a designation unit. The preliminary analysis unit executes malware obtained as a candidate for an analyzing subject to obtain information related to communication transmitted from the malware. The determination unit determines whether the malware is handled as an analyzing subject based on information obtained by the preliminary analysis unit. The designation
(Continued)

| MALWARE IDENTIFIER | OBTAINED DATE AND TIME | CLOSED-ENVIRONMENT PRELIMINARY ANALYSIS INFORMATION ||||||||
|---|---|---|---|---|---|---|---|---|---|
| | | EXECUTION ENVIRONMENT INFORMATION | EXECUTION RESULT | PRESENCE OF DATA TRANSMISSION GENERATION | PRESENCE OF DIRECT DESIGNATION OF IP ADDRESS | PRESENCE OF SUCCESSFUL NAME RESOLUTION | NUMBER OF COMMUNICATION COUNTERPARTS | | |
| ... | ... | ... | ... | ... | ... | ... | ... | ... | ... |
| M011 | 2015/1/15 09:15:35 | A001 | × | - | - | - | - | ... | ... |
| | | A002 | O | O | × | × | - | ... | ... |
| | | A003 | O | O | O | O | 23 | ... | ... |
| | | ... | ... | ... | ... | ... | ... | ... | ... |
| M012 | 2015/1/16 09:38:13 | A001 | × | - | - | - | - | ... | ... |
| | | A002 | O | × | - | - | - | ... | ... |
| | | A003 | O | O | × | O | 18 | ... | ... |
| | | ... | ... | ... | ... | ... | ... | ... | ... |
| ... | ... | ... | ... | ... | ... | ... | ... | ... | ... | unit designates an analyzing order with respect to malware having been determined by the determination unit as an analyzing subject based on information obtained by the preliminary analysis unit.

15 Claims, 10 Drawing Sheets

(51) Int. Cl.

| | | |
|---|---|---|
| *G06F 12/16* | (2006.01) | |
| *G08B 23/00* | (2006.01) | |
| *H04L 29/06* | (2006.01) | |
| *G06F 21/56* | (2013.01) | |
| *G06F 21/53* | (2013.01) | |

(56) References Cited

U.S. PATENT DOCUMENTS

| | | | | |
|---|---|---|---|---|
| 9,189,629 | B1* | 11/2015 | Nachenburg | G06F 21/12 |
| 9,516,058 | B2* | 12/2016 | Antonakakis | H04L 63/1483 |
| 9,800,588 | B1* | 10/2017 | Watson | H04L 63/14 |
| 2009/0199296 | A1* | 8/2009 | Xie | G06F 21/316 |
| | | | | 726/23 |
| 2010/0031353 | A1 | 2/2010 | Thomas et al. | |
| 2011/0078794 | A1 | 3/2011 | Manni et al. | |
| 2011/0283361 | A1 | 11/2011 | Perdisci et al. | |
| 2012/0117652 | A1 | 5/2012 | Manni et al. | |
| 2012/0304244 | A1* | 11/2012 | Xie | G06F 21/00 |
| | | | | 726/1 |
| 2013/0067577 | A1* | 3/2013 | Turbin | G06F 21/56 |
| | | | | 726/24 |
| 2013/0091571 | A1* | 4/2013 | Lu | G06F 21/563 |
| | | | | 726/23 |
| 2014/0053267 | A1* | 2/2014 | Klein | G06F 21/552 |
| | | | | 726/23 |
| 2014/0096184 | A1* | 4/2014 | Zaitsev | G06F 21/56 |
| | | | | 726/1 |
| 2014/0130161 | A1* | 5/2014 | Golovanov | G06F 21/564 |
| | | | | 726/23 |
| 2015/0026808 | A1 | 1/2015 | Perdisci et al. | |
| 2015/0088967 | A1* | 3/2015 | Muttik | G06F 21/55 |
| | | | | 709/203 |
| 2015/0121526 | A1* | 4/2015 | McLarnon | H04L 63/14 |
| | | | | 726/23 |
| 2015/0319136 | A1 | 11/2015 | Xie et al. | |
| 2016/0127396 | A1* | 5/2016 | Iwamura | G06F 21/562 |
| | | | | 726/22 |
| 2016/0373447 | A1* | 12/2016 | Akiyama | H04L 63/1416 |
| 2017/0223040 | A1* | 8/2017 | Ikuse | G06F 21/55 |
| 2018/0091453 | A1* | 3/2018 | Jakobsson | H04L 51/12 |
| 2018/0218155 | A1* | 8/2018 | Grafi | G06F 21/554 |
| 2019/0207969 | A1* | 7/2019 | Brown | G06F 16/38 |

FOREIGN PATENT DOCUMENTS

| | | | | |
|---|---|---|---|---|
| CN | 103886252 A | | 6/2014 | |
| JP | 2010-15513 A | | 1/2010 | |
| JP | 2014-89593 A | | 5/2014 | |
| JP | 2014-89609 A | | 5/2014 | |
| WO | WO-2005001733 A1 * | | 1/2005 | G06Q 10/107 |

OTHER PUBLICATIONS

"Chinyang Henry Tseng, Shiahuey Wang, Sheng-Chao Wang, Tong-Ying Juang, Proactive malware collection and classification system: How to collect and classify useful malware samples, Apr. 26-28, 2014, IEEE, INSPEC#14714767" (Year: 2014).*

"Mohammad Imran, Muhammad Tnvir Afzal, Muhammad Abdul Qadir, Using hidden markov model for dynamic malware analysis: First Impressions, Aug. 15-17, 2015, IEEE Xplore, INSPEC#15704170" (Year: 2015).*

"Muhammad Ejz Ahmed, Surya Nepal, Hyoungshick Kim, Malware Detection Using Statistical Analysis of System's Behavior, Oct. 18-20, 2018, IEEE Xplore, INSPEC#18269464" (Year: 2018).*

Extended European Search Report dated Jun. 1, 2018 in European Patent Application No. 15880147.2, 7 pages.

International Search Report dated Mar. 22, 2016 in PCT/JP2015/085104 filed Dec. 15, 2015.

Takeo Hariu, et al., "Technology of Detection, Analysis, and Countermeasure of Cyber Attacks by Evolving Malwares" NTT Gijutsu Journal, Aug. 2012, 19 Pages (with partial English language translation).

Grégoire Jacob, et al., "A static, packer-agnostic filter to detect similar malware samples" DIMVA 2012, 2012, 20 Pages.

Matthias Neugschwandtner, et al., "FORECAST—Skimming off the Malware Cream" ACSAC 2011, Dec. 2011, 10 Pages.

Office Action dated Oct. 21, 2019 in Chinese Application No. 20158007444.2 (computer-generated English translation).

* cited by examiner

| MALWARE IDENTIFIER | REGISTRATION DATE AND TIME | ... |
|---|---|---|
| ... | ... | ... |
| M001 | 2014/12/28 22:25:14 | ... |
| ... | ... | ... |
| M002 | 2015/1/5 9:15:16 | ... |
| ... | ... | ... |
| M003 | 2015/1/14 15:02:00 | ... |
| ... | ... | ... |

FIG.4

| MALWARE IDENTIFIER | OBTAINED DATE AND TIME | CLOSED-ENVIRONMENT PRELIMINARY ANALYSIS INFORMATION 122 ||||||| |
| --- | --- | --- | --- | --- | --- | --- | --- |
| | | EXECUTION ENVIRONMENT INFORMATION | EXECUTION RESULT | PRESENCE OF DATA TRANSMISSION GENERATION | PRESENCE OF DIRECT DESIGNATION OF IP ADDRESS | PRESENCE OF SUCCESSFUL NAME RESOLUTION | NUMBER OF COMMUNICATION COUNTERPARTS | ... |
| ⋮ | ⋮ | ⋮ | ⋮ | ⋮ | ⋮ | ⋮ | ⋮ | ⋮ |
| M011 | 2015/1/15 09:15:35 | A001 | × | - | - | - | - | ⋮ |
| | | A002 | ○ | ○ | × | × | - | ⋮ |
| | | A003 | ○ | ○ | ○ | ○ | 23 | ⋮ |
| M012 | 2015/1/16 09:38:13 | A001 | × | - | - | - | - | ⋮ |
| | | A002 | ○ | × | - | - | - | ⋮ |
| | | A003 | ○ | ○ | × | ○ | 18 | ⋮ |
| ⋮ | ⋮ | ⋮ | ⋮ | ⋮ | ⋮ | ⋮ | ⋮ | ⋮ |

FIG.5

| MALWARE IDENTIFIER | OBTAINED DATE AND TIME | EXECUTION ENVIRONMENT INFORMATION | OPEN-ENVIRONMENT PRELIMINARY ANALYSIS INFORMATION ||||
|---|---|---|---|---|---|---|
| | | | EXECUTION RESULT | PRESENCE OF COMMUNICATION GENERATION | PRESENCE OF COMMUNICATION HAVING NO ERROR | NUMBER OF COMMUNICATION COUNTERPARTS IN WHICH RESPONSE IS RECEIVED |
| ⋮ | ⋮ | ⋮ | ⋮ | ⋮ | ⋮ | ⋮ |
| M021 | 2015/1/17 11:08:30 | A001 | × | - | - | - |
| | | A002 | ○ | ○ | × | - |
| | | A003 | ○ | ○ | ○ | 17 |
| ⋮ | | ⋮ | ⋮ | ⋮ | ⋮ | ⋮ |
| M022 | 2015/1/19 12:25:41 | A001 | × | - | - | - |
| | | A002 | × | - | - | - |
| | | A003 | ○ | ○ | ○ | 13 |
| ⋮ | ⋮ | ⋮ | ⋮ | ⋮ | ⋮ | ⋮ |

| MALWARE IDENTIFIER | PRIORITY | NUMBER OF COMMUNICATION COUNTERPARTS | REGISTRATION DATE AND TIME | ... |
|---|---|---|---|---|
| ... | ... | ... | ... | ... |
| M043 | 1 | 135 | 2015/1/23 17:10:15 | |
| M035 | 2 | 115 | 2015/1/21 16:00:05 | |
| M032 | 3 | 97 | 2015/1/20 17:10:15 | |
| ... | ... | ... | ... | ... |

30

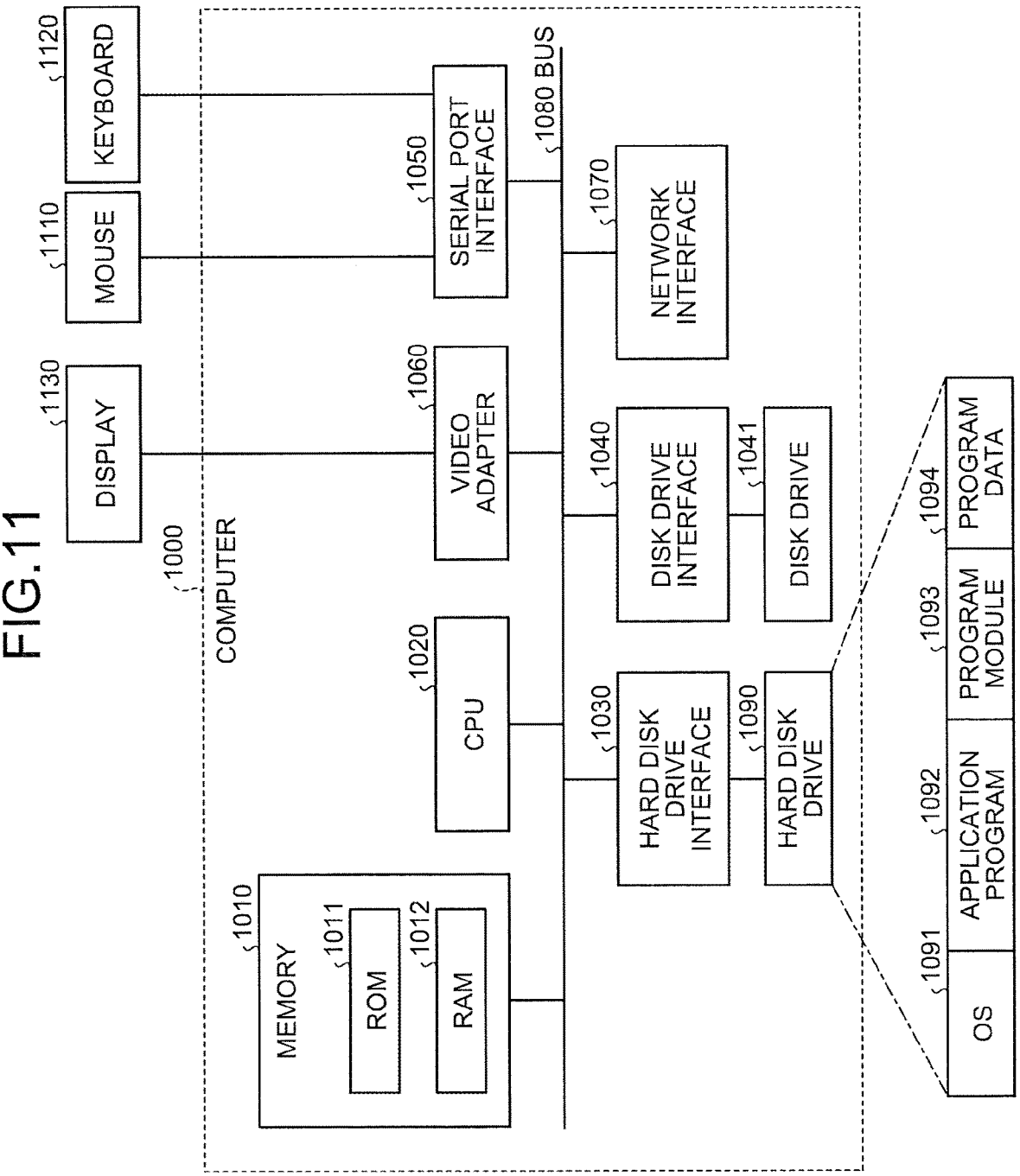

MALWARE ANALYSIS SYSTEM, MALWARE ANALYSIS METHOD, AND MALWARE ANALYSIS PROGRAM

FIELD

The present invention relates to a malware analysis system, a malware analysis method, and a malware analysis program.

BACKGROUND

In recent years, malicious programs (hereinafter, "malware") that cause threats such as information leakage and unauthorized accesses have been rampant. The technique for causing malware infection has become more complicated and sophisticated year by year, and it is becoming difficult to completely prevent such infection. Therefore, not only measures for preventing malware infection, but measures for suppressing the damages after being infected with malware to the minimum have been required.

In order to suppress the damages after being infected with malware, it is desirable to find the infected terminal early to make the terminal harmless. As an example of such measures, there is exemplified a method of monitoring communication transmitted from terminals (network monitoring). In the network monitoring, an infected terminal is detected by detecting communication to an attacker server that is generated after being infected with malware. The detection based on communication generated from malware is also useful in a feature that the measures themselves are not disabled by the malware.

As a specific method, there has been employed a method of collecting communication counterpart information of malware and creating a blacklist of collected information, based on a method of performing an analysis on malware while executing it (hereinafter, "dynamic analysis"). In network monitoring, the size and freshness of the blacklist determine the effect of the measures. If the size of the blacklist is small, omission of malware happens, and if the information in the blacklist is old, effectiveness of the measures cannot be expected. Therefore, it is important to analyze malware as many times as possible and to collect information such as an IP address indicating a communication counterpart of an existing attacker server, an FQDN (Fully Qualified Domain Name), and a URL (Uniform Resource Locator). That is, in order to create a blacklist for the purpose of taking measures after being infected with malware, it is desirable to perform a dynamic analysis for a certain period of time in a state where all the collected samples are connected to a network.

However, the number of the types of malware being newly found on a daily basis is very large, and the calculation resources for analyzing the newly found malware are limited, so that it is difficult to analyze all the newly found malware. Therefore, there has been required a method of effectively selecting samples to be handled as analyzing subjects from collected samples (malware). For example, there has been known a technique of realizing avoidance of analysis redundancy by calculating a similarity among program codes of malware (for example, Non Patent Literature 1). Further, there has been known a technique of predicting a result of a dynamic analysis based on a result of a static analysis in order to select samples that are suitable for creating a blacklist (for example, Non Patent Literature 2).

CITATION LIST

Non Patent Literatures

Non Patent Literature 1: Gregoire Jacob, Paolo Milani Comparetti, Matthias Neugschwandtner, Christopher Kruegel, Giovanni Vigna, "A Static, Packer-Agnostic Filter to Detect Similar Malware Samples", DIMVA 2012

Non Patent Literature 2: Matthias Neugschwandtner, Paolo Milani Comparetti, Gregoire Jacob, Christopher Kruegel, "FORECAST: Skimming off the Malware Cream", ACSAC 2011

SUMMARY

Technical Problem

However, with the conventional techniques described above, it is difficult to effectively select malware to be analyzed. Specifically, even if a similarity among program codes is calculated based on a static analysis, there is a case where discrepancies of communication counterparts not extracted based on the similarity of program codes are overlooked. Further, when an operation of a dynamic analysis is to be predicted based on a result of a static analysis, in a case where a new type of malware has appeared or a case where a process of obfuscating program codes has been applied on malware, it is not possible to extract characteristics of the program codes, and thus the possibility of overlooking the samples that perform communication becomes higher.

The present invention has been achieved in view of the above problems, and an object of the invention is to provide a malware analysis system, a malware analysis method, and a malware analysis program that can effectively select malware to be analyzed.

Solution to Problem

To solve a problem and to achieve an object, a malware analysis system includes: a preliminary analysis unit that executes malware obtained as a candidate for an analyzing subject to obtain information related to communication transmitted from the malware; a determination unit that determines whether the malware is handled as an analyzing subject based on information obtained by the preliminary analysis unit; and a designation unit that designates an analyzing order with respect to malware having been determined by the determination unit as an analyzing subject based on information obtained by the preliminary analysis unit.

Advantageous Effects of Invention

According to an example of embodiments to be disclosed in the present application, it is possible to effectively select malware to be analyzed.

BRIEF DESCRIPTION OF DRAWINGS

FIG. 4 is a diagram illustrating an example of a closed-environment execution log table according to the embodiment.

FIG. 5 is a diagram illustrating an example of an open-environment execution log table according to the embodiment.

FIG. 6 is a diagram illustrating an example of an analyzing subject DB according to the embodiment.

FIG. 11 is a diagram illustrating a computer that executes a malware analysis program.

DESCRIPTION OF EMBODIMENTS

Exemplary embodiments of a malware analysis system, a malware analysis method, and a malware analysis program according to the present application will be described below in detail with reference to the accompanying drawings. The malware analysis system, the malware analysis method, and the malware analysis program according to the present application are not limited to the embodiments.

[Example of Analysis Process]

Figure 1:
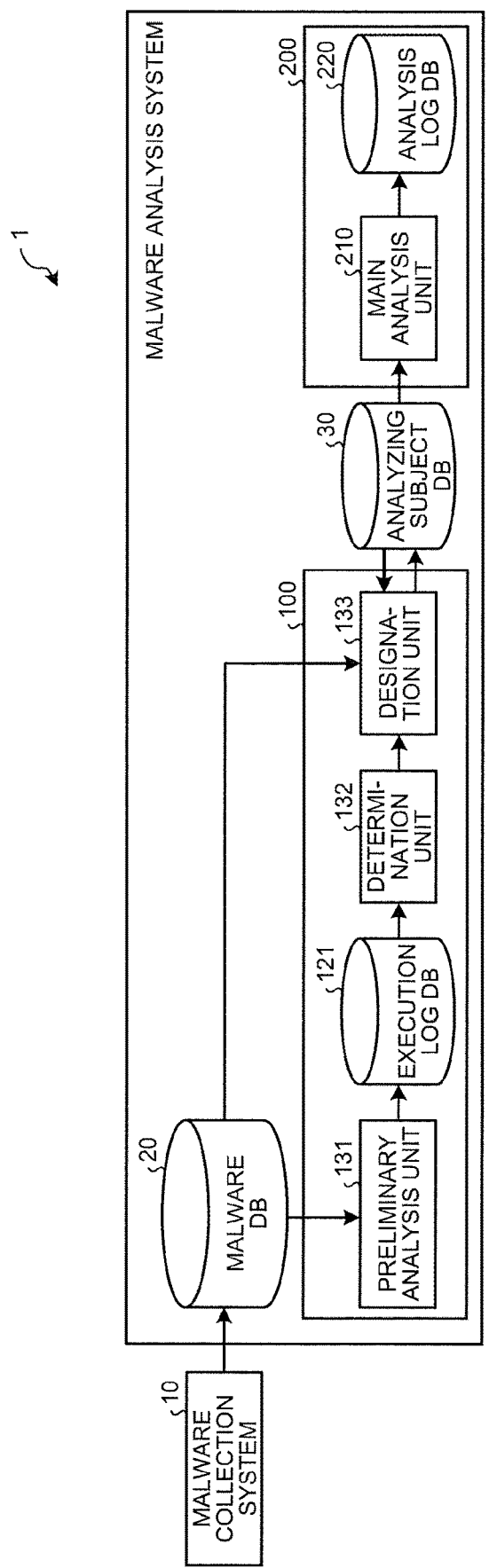
FIG. 1 is a diagram illustrating an example of an analysis process performed by a malware analysis system according to an embodiment.

First, with reference to FIG. 1, an example of an analysis process performed by a malware analysis system 1 according to an embodiment is described. FIG. 1 is a diagram illustrating an example of the analysis process performed by the malware analysis system 1 according to the present embodiment. As illustrated in FIG. 1, the malware analysis system 1 includes a malware DB (Database) 20, a preliminary analysis device 100, an analyzing subject DB 30, and a main analysis device 200.

The malware DB 20 is a database included in a predetermined storage server, and malware collected by a malware collection system 10 is stored therein. The malware collection system 10 is constituted by devices such as a server device that collects malware as a sample, via a communication network (for example, the Internet). The malware collection system 10 collects, for example, malware registered in a malware sharing site present on the Internet. The malware collection system 10 then stores the collected malware itself and information attached to the malware in the malware DB 20. The information attached to the malware is, for example, registration date and time when the malware is registered in the malware sharing site for the first time.

The preliminary analysis device 100 is a server device that performs a preliminary analysis on malware in order to select the type of malware to be analyzed. The preliminary analysis device 100 selects malware to be analyzed by the main analysis device 200, by performing a preliminary analysis on information related to the malware stored in the malware DB 20.

The analyzing subject DB 30 is a database included in a predetermined storage server, and malware as an analyzing subject is stored therein. As for pieces of malware stored in the analyzing subject DB 30, the priority of performing an analysis thereon by the main analysis device 200 is designated by the preliminary analysis device 100.

The main analysis device 200 is a server device that performs an analysis of a malignancy determination and the like, in order of a higher priority of malware designated by the preliminary analysis device 100 among malware stored in the analyzing subject DB 30. In the following descriptions, an example of the analysis process performed by the malware analysis system 1 including the respective devices described above is explained along with a process flow. In the following descriptions, an analysis related to a selection process of malware executed by the preliminary analysis device 100 is referred to as "preliminary analysis", and an analysis related to a malignancy determination process and the like of malware executed by the main analysis device 200 is referred to as "main analysis". Further, in the following descriptions, malware as a subject for the analysis process is sometimes referred to as "sample".

First, the preliminary analysis device 100 obtains malware that has not yet undergone a preliminary analysis, among the malware stored in the malware DB 20. Subsequently, a preliminary analysis unit 131 related to the preliminary analysis device 100 performs a preliminary analysis on the obtained malware. A preliminary analysis process performed by the preliminary analysis unit 131 is carried out with the dynamic analysis process for operating malware and measuring the status and the like of communication data generated from the malware. While details thereof are described later, the preliminary analysis process of malware performed by the preliminary analysis process is carried out in any of two types of environments, which are an environment in which malware and an external communication network are disconnected from each other, that is, an environment in which malware and the Internet are not connected to each other (hereinafter, "closed environment") and an environment in which malware and the Internet can be connected to each other (hereinafter, "open environment"), or is carried out in an environment in which these two types of environments are combined with each other. When a preliminary analysis is performed in an environment in which these two types are combined with each other, the result obtained in the open environment is prioritized. Further, the preliminary analysis process of malware performed by the preliminary analysis unit 131 is also performed in other various types of execution environments, such as various types of versions of an OS (Operating System) of a terminal on which malware is executed or an application installed on the OS.

Thereafter, the preliminary analysis unit 131 stores an execution log, which is an execution result of a preliminary analysis, in an execution log DB 121. Subsequently, based on information stored in the execution log DB 121, a determination unit 132 performs a process of determination on malware on which a main analysis is performed. For example, the determination unit 132 determines whether a main analysis should be performed on malware, based on criteria such as whether the malware has been establishing communication with an external server via the Internet during the preliminary analysis process.

Subsequently, a designation unit 133 performs a process of designating a priority on malware having been determined by the determination unit 132 as a subject for a main analysis. The designation of the priority is performed based on, for example, the date and time when the malware is registered in a malware sharing site and the like, or the number of communication counterparts related to communication generated by the malware. Thereafter, the designation unit 133 associates the designated priority, execution-environment setting information such as the version of an OS (Operating System) used at the time of a preliminary analysis, and the malware itself to one another, and stores the associated information in the analyzing subject DB 30.

Subsequently, a main analysis unit 210 related to the main analysis device 200 performs a main analysis process on malware stored in the analyzing subject DB 30 according to the priority designated by the preliminary analysis device 100. Thereafter, the main analysis unit 210 stores the result of the main analysis process on the malware in an analysis log DB 220. That is, the main analysis unit 210 analyzes information such as information of a server that is a communication counterpart of malware causing malignant communication. Due to this configuration, the malware analysis system 1 can create a so-called "blacklist" with respect to malware.

In this manner, the malware analysis system 1 obtains information related to communication generated by malware by, as a preliminary analysis, executing malware obtained as a candidate for an analyzing subject. Subsequently, based on the information obtained by the preliminary analysis, the malware analysis system 1 determines whether the malware is handled as a subject for a main analysis. The malware analysis system 1 then designates the order of performing a main analysis on the malware having been determined as an analyzing subject.

That is, by performing the preliminary analysis described above, the malware analysis system 1 obtains information related to predetermined communication with respect to, for example, malware having the same program code as that of previous malware but having a different communication counterpart, new type of malware, or malware having superficial characteristics thereof hidden by packing. Thereafter, the malware analysis system 1 extracts malware having a high possibility of performing malignant communication based on the result of the preliminary analysis. In other words, the malware analysis system 1 can effectively select an IP address as information related to a communication counterpart included in the communication generated by malware, an FQDN, and malware as a subject for collecting URLs. As a result, the malware analysis system 1 can effectively proceed an analysis process on pieces of malware that should be blacklisted, among a very large number of pieces of malware.

[Configuration of Malware Analysis System]

Respective devices that constitute the malware analysis system 1 described above are explained below in detail with reference to the accompanying drawings.

(Malware DB 20)

The malware DB 20 is realized by, for example, a semiconductor memory device such as a RAM (Random Access Memory) or a flash memory, or a storage device such as a hard disk or an optical disk.

Figures 2, 3:
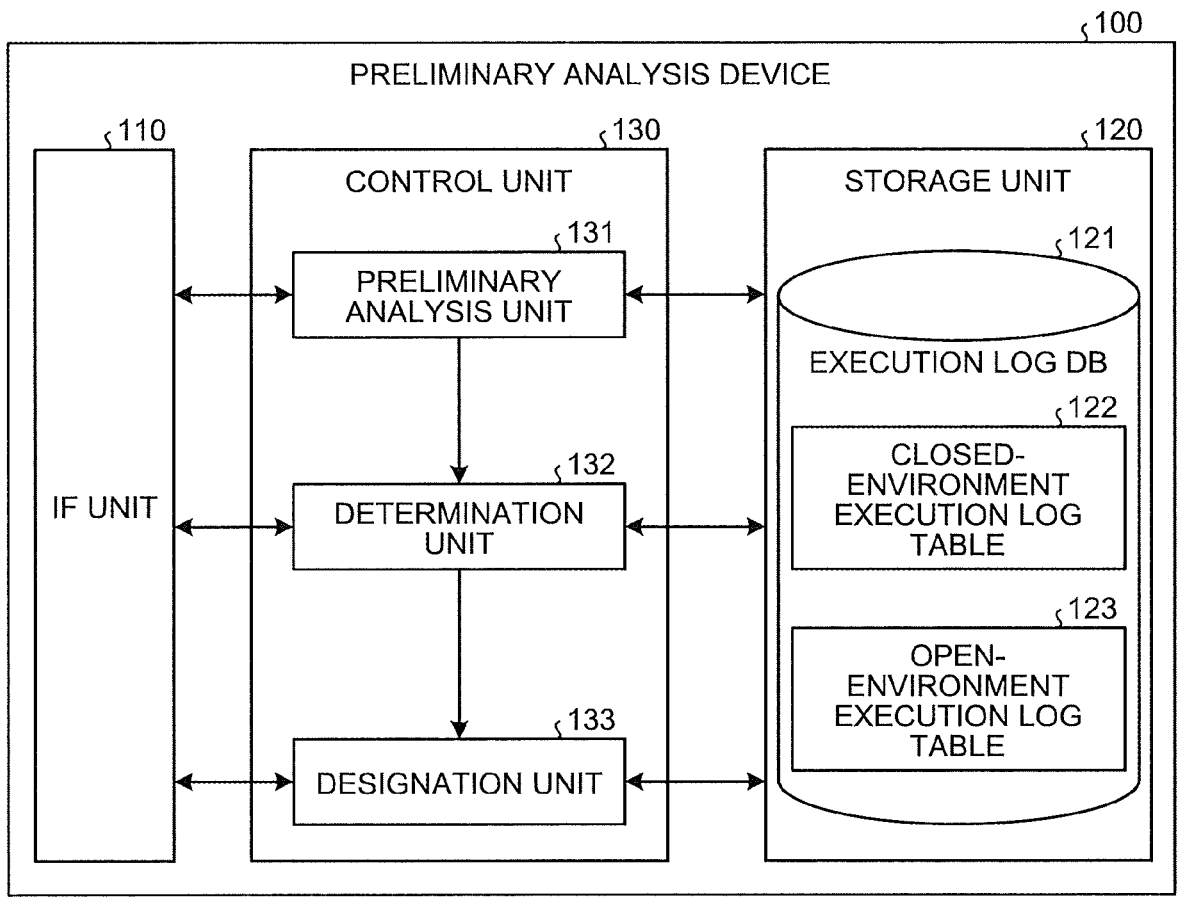
FIG. 2 is a diagram illustrating an example of a malware DB according to the embodiment.
FIG. 3 is a diagram illustrating an example of a configuration of a preliminary analysis device according to the embodiment.

The malware DB 20 stores therein information related to malware collected by the malware collection system 10. FIG. 2 illustrates an example of the malware DB 20 according to the present embodiment. As illustrated in FIG. 2, the malware DB 20 includes items such as "malware identifier" and "registration date and time".

The "malware identifier" indicates identification information for identifying malware. The "registration date and time" indicates the date and time when malware is registered in a malware sharing site and the like for the first time. When malware is collected by the malware collection system 10 without via a malware collection site, the date and time when the malware is stored in the malware DB 20 can be stored as the registration date and time.

That is, in FIG. 2, as an example of information stored in the malware DB 20, there is exemplified a case where malware identified as a malware identifier "M001" is registered at "2014/12/28 22:25:14".

In the following descriptions, the identifier stored in the item of "malware identifier" is sometimes used as a reference sign. For example, in the following descriptions, the malware identified by the malware identifier "M001" is sometimes referred to as "malware M001".

(Preliminary Analysis Device 100)

The preliminary analysis device 100 according to the present embodiment is described next with reference to FIG. 3. FIG. 3 is a diagram illustrating an example of the configuration of the preliminary analysis device according to the present embodiment. As exemplified in FIG. 3, the preliminary analysis device 100 according to the present embodiment includes an IF (interface) unit 110, a storage unit 120, and a control unit 130.

The IF unit 110 is an NIC (Network Interface Card), for example, and transmits and receives various types of data between external devices. For example, the IF unit 110 transmits and receives information related to malware between the malware DB 20, respective storage servers including the analyzing subject DB 30, or the main analysis device 200.

The storage unit 120 is realized by, for example, a semiconductor memory device such as a RAM or a flash memory, a hard disk, or an optical disk. The storage unit 120 includes the execution log DB 121. The execution log DB 121 includes a closed-environment execution log table 122 that stores therein a result of performing a preliminary analysis in a closed environment and an open-environment execution log table 123 that stores therein a result of performing a preliminary analysis in an open environment.

(Closed-Environment Execution Log Table 122)

FIG. 4 illustrates an example of the closed-environment execution log table 122 according to the present embodiment. As illustrated in FIG. 4, the closed-environment execution log table 122 includes items such as "malware identifier", "obtained date and time", and "closed-environment preliminary analysis information". The "closed-environment preliminary analysis information" includes sub-items such as "execution environment information", "execution result", "presence of data transmission generation", "presence of direct designation of IP address", "presence of successful name resolution", and "number of communication counterparts".

The "malware identifier" indicates identification information for identifying malware. The "obtained date and time" indicates the date and time when closed-environment preliminary analysis information is obtained by performing a preliminary analysis. The obtained date and time can be stored for each of execution environment information described later.

The "closed-environment preliminary analysis information" indicates a result of performing a preliminary analysis in a closed environment. The "execution environment information" indicates environment information when malware is executed for a preliminary analysis. In FIG. 4, the execution environment information is represented as a concept such as "A001"; however, in practice, an execution environment constituted by a combination of various types of information such as the version of an OS when malware is executed, the presence or the version of a run-time library within a terminal in which malware is executed, and the presence of installation or the version of an application, is stored.

The "execution result" indicates whether malware is actually operated in each execution environment information when a preliminary analysis is performed. When the item of the "execution result" is "○", it is indicated that the malware is operated, and when the execution result is "×", it is indicated that the malware is not operated. Whether the malware is actually operated can be determined based on checking, for example, whether process generation has been successful or whether there is any error at the time of execution. Specifically, when process generation has been successful or there is no error at the time of execution, it is possible to determine that the malware is actually operated.

The "presence of data transmission generation" indicates whether any behavior of data transmission is observed when malware is operated. When the item of the "presence of data transmission generation" is "○", it is indicated that a behavior of data being transmitted from malware is observed, and when the item of the "presence of data transmission generation" is "×", it is indicated that any behavior of data being transmitted from malware is not observed. When the item of "execution result" is "×", any behavior of data transmission from malware is not observed, so that, as the item of the "presence of data transmission generation" and the items after that, "–" is stored.

The "presence of direct designation of IP address" indicates whether data transmission, in which an IP address is directly designated when malware is operated, is observed. When the item of the "presence of direct designation of IP address" is "○", it is indicated that data transmission in which an IP address is directly designated is observed, and when the item of the "presence of direct designation of IP address" is "×", it is indicated that any data transmission in which an IP address is directly designated is not observed.

The "presence of successful name resolution" indicates whether the address of a server and the like of a communication counterpart has been identified by performing malware communication. When the item of the "presence of successful name resolution" is "○", it is indicated that name resolution is successful, and when the item of the "presence of successful name resolution" is "×", it is indicated that name resolution is not successful. Further, when the item of the "presence of successful name resolution" is "–", it indicates a case where any name resolution cannot be performed in the first place because malware is not operated, or a case where it is not necessary to perform name resolution. A case where it is not necessary to perform name resolution is, for example, a case where, because communication for directly designating an IP address from malware has been observed, it is possible to determine that the malware is handled as a subject for a main analysis without performing any detailed name resolution. In this case, even when the item of the "presence of data transmission generation" or the item of the "presence of direct designation of IP address" is "○", there is a case where the item of the "presence of successful name resolution" is "–".

The "number of communication counterparts" indicates the number of counterparts where malware has a behavior of performing a communication process. Specifically, the number of communication counterparts indicates the number of IP addresses that are the communication counterparts of the malware.

That is, in FIG. 4, when the closed-environment preliminary analysis information to malware M011 is obtained "2015/1/15 9:15:35", and the execution environment information is "A001", as for the closed-environment preliminary analysis information in this case, it is indicated that the execution result is "×", and the malware is not operated. As another example, when the execution environment information is "A002", it is indicated that the malware is operated, a behavior of data transmission is observed, but communication where an IP address is directly designated is not observed. As still another example, when the execution environment is "A003", it is indicated the malware is operated, a behavior of data transmission is observed, communication where an IP address is directly designated is observed, and the number of communication counterparts is "23".

(Open-Environment Execution Log Table 123)

Next, FIG. 5 illustrates an example of the open-environment execution log table 123 according to the present embodiment. As illustrated in FIG. 5, the open-environment execution log table 123 includes items such as "malware identifier", "registration date and time", and "open-environment preliminary analysis information". The "open-environment preliminary analysis information" includes sub-items such as "execution environment information", "execution result", "presence of communication generation", "presence of communication having no error", and "number of communication counterparts in which response is received". As for the items same as those in FIG. 4, descriptions thereof will be omitted.

The "open-environment preliminary analysis information" indicates a result when a preliminary analysis is performed in an open environment. The item of the "presence of communication generation" corresponds to the "presence of data transmission generation". In FIG. 4, the item is set as "presence of data transmission generation", because in a closed environment, any communication is not observed and only a behavior of transmitting data unilaterally from malware is observed.

The "presence of communication having no error" indicates that there is a counterpart such as a server to communication from malware, and indicates whether communication having no error is observed at least once. Errors in communication are defined for each protocol. For example, when the protocol is an HTTP (Hypertext Transfer Protocol), the error in communication corresponds to any number other than two-hundredth errors. Protocols used in the malware include an FTP (File Transfer Protocol) and an SMTP (Simple Mail Transfer Protocol), for example. When the type of the protocol is not known, the error in this case corresponds to a connection failure due to time-out, for example.

The "number of communication counterparts in which response is received" indicates the number of communication counterparts with which communication having no error has been performed in communication in a malware preliminary analysis. In a predetermined communication counterpart, even when there is communication where an error has occurred at an address designated in a lower layer, if communication having no error is established at different addresses, these addresses can be counted in the "number of communication counterparts in which response is received". Specifically, in HTTP communication, even when an error such as "404 Not Found (Error)" occurs in "http://example.com/a.html", if any error has not occurred as indicated by "200 O.K. (No error)" in "http://example.com/b.html", "http://example.com" can be counted as a communication counterpart in which communication having no error has been performed.

That is, in FIG. 5, when the open-environment preliminary analysis information to malware M021 is obtained on "2015/1/17 11:08:30" and when the execution environment information is "A001", the execution result of the open-environment preliminary analysis information is "×", and it is indicated that the malware is not operated. As another example, when the execution environment information is "A002", it is indicated that malware is operated, generation of communication is observed, but only an error is returned with respect to the generated communication. As still another example, when the execution environment information is "A003", it is indicated that malware is operated, communication is generated, communication having no error is performed, and the number of communication counterparts is "17".

(Control Unit 130)

The control unit 130 is realized by, for example, an integrated circuit such as an ASIC (Application Specific Integrated Circuit) or an FPGA (Field Programmable Gate Array). Further, the control unit 130 is realized as, for example, a program stored in a storage device (not illustrated) is executed by a unit such as a CPU (Central Processing Unit) or an MPU (Micro Processing Unit) while having a RAM as a work area. Further, the control unit 130 includes the preliminary analysis unit 131, the determination unit 132, and the designation unit 133, and performs a preliminary analysis process with respect to malware. The respective processing units are described below.

(Preliminary Analysis Unit 131)

The preliminary analysis unit 131 performs a preliminary analysis on malware (sample) that is handled as a processing subject. Specifically, as a preliminary analysis, by executing malware obtained as a candidate for an analyzing subject, the preliminary analysis unit 131 according to the present embodiment obtains information related to communication to be transmitted from the malware. In this case, executing malware means actually operating a sample as a program in a predetermined terminal. Further, the preliminary analysis unit 131 obtains a sample handled as a processing subject from the malware DB 20. In this case, the preliminary analysis unit 131 first obtains information of malware stored in the malware DB 20, and when there are unanalyzed samples, the preliminary analysis unit 131 obtains these samples. At this time, among the unanalyzed samples, the preliminary analysis unit 131 obtains newly registered samples preferentially. At the time of obtaining samples from the malware DB 20, the preliminary analysis unit 131 also obtains information attached to the samples. For example, the preliminary analysis unit 131 obtains information such as information related to the date and time when malware is registered for the first time in a predetermined database, in which pieces of malware are stored in an integrated manner via a communication network.

The preliminary analysis unit 131 generates communication by, as a preliminary analysis, performing a dynamic analysis on a sample and observes the behavior of the communication, thereby obtaining information related to communication transmitted from the sample. At this time, the preliminary analysis unit 131 stores an execution log generated by the communication of the sample in the execution log DB 121.

At the time of performing a preliminary analysis on a sample, the preliminary analysis unit 131 appropriately changes an execution environment as an environment in which a sample is executed. For example, in the terminal in which the sample is executed, the preliminary analysis unit 131 performs an operation in a plurality of execution environments in which an OS, a library, and an application to be installed in the terminal are arbitrarily combined with one another, thereby obtaining information related to communication generated from malware, for each of the execution environments. At this time, in a case where an error is generated when a sample is caused to perform communication and an execution environment not used for the preliminary analysis of the sample exists, the preliminary analysis unit 131 changes the execution environment and performs an analysis again. Due to this configuration, it is possible to effectively perform a preliminary analysis even on a sample having a behavior such as being operated only in an environment in which a specific library is installed.

When any error does not occur at the time of execution of a sample or when an analysis is performed on the sample in all adoptable execution environments, the preliminary analysis unit 131 ends the preliminary analysis with respect to the sample. Thereafter, the preliminary analysis unit 131 registers the analysis result and information of the execution environment used for the analysis in the execution log DB 121. After registering the information related to the sample, the preliminary analysis unit 131 shifts to a preliminary analysis process for the next sample. As for the execution environment, the preliminary analysis unit 131 can store information in the execution log DB 121 while performing an analysis at the same time in all the execution environments and without checking an executing operation in each of the environments.

At the time of performing a preliminary analysis on a sample, the preliminary analysis unit 131 can perform the preliminary analysis in a closed environment in which a pseudo response is enabled, or can perform the preliminary analysis in an open environment in which the sample is connected to the Interment.

A process of the preliminary analysis unit 131 for performing a preliminary analysis in a closed environment is described below. The advantage of performing a preliminary analysis in a closed environment is that, because any communication between malware and a sever on the Internet is not generated, the behavior of the malware can be analyzed without being known by the attacker. Meanwhile, there is a disadvantage such that, because the malware does not actually communicate with a server, it is not possible to ascertain whether the server is continuing to respond.

In the closed environment, by performing a preliminary analysis, the preliminary analysis unit 131 obtains information related to data transmission generated from a sample. In this case, the preliminary analysis unit 131 stores an execution log in the closed-environment execution log table 122 in the execution log DB 121. As illustrated in FIG. 4, in the generated data transmission, the preliminary analysis unit 131 the preliminary analysis unit 131 obtains information such as whether a direct designation related to an IP address as a transmission destination has been present or whether a name resolution by a sample has been successful, in other words, whether an error with respect to a DNS (Domain Name System) query has been generated. As for whether a name resolution in the closed environment has been successful, it can be confirmed by checking whether the name resolution can be performed in a different environment in which the sample can be connected to the Internet after finishing the preliminary analysis. Further, as for the DNS query, it is possible to check whether the name resolution has been successful at the time of the analysis by forwarding the DNS query to outside.

A preliminary analysis in an open environment is described next. The advantage of performing a preliminary analysis in an open environment is that malware can be analyzed while actually receiving data from a server on the Internet.

Therefore, in the preliminary analysis, the preliminary analysis unit 131 can obtain information such as whether there is any response from a server or contents of the response. In this case, the preliminary analysis unit 131 stores an execution log in the open-environment execution log table 123 in the execution log DB 121. For example, as illustrated in FIG. 5, when communication is generated from a sample, the preliminary analysis unit 131 can obtain information such as whether there is any communication having no error and the number of communication counterparts of communication where a response has been received.

For convenience of explanations, while there has been described an example in which both the closed-environment execution log table 122 and the open-environment execution log table 123 are present in the execution log DB 121, execution logs can be stored together for each sample, regardless of whether it is a closed environment or an open environment. In this case, as for information not to be obtained due to a fact that its environment is different (for example, information such as "number of communication counterparts in which response is received" in a closed environment), it is not stored in an execution log.

The preliminary analysis device 100 can decide in advance whether a preliminary analysis is performed in a closed environment or in an open environment. This determination is made because the contents of processes performed by the determination unit 132 and the designation unit 133 are different depending on the environment adopted in the preliminary analysis. When the preliminary analysis device 100 switches a closed environment and an open environment for each sample, the designation unit 133 decides the priority as to which one of a sample having been analyzed in the closed environment and a sample having been analyzed in the open environment is analyzed first based on predetermined criteria.

Further, when a preliminary analysis is performed, for example, the preliminary analysis unit 131 can perform, as a method for avoiding interferences of an analysis caused by malware, a process of monitoring a call for an API (Application Programming Interface) such as a sleep function, thereby shortening a sleep time. Furthermore, when malware is set to be automatically activated after being rebooted, the preliminary analysis unit 131 can use a mechanism by which an automatically activated sample is forcibly executed or the sample is rebooted. Further, the preliminary analysis unit 131 can transmit information related to a used analysis-interference avoiding method to the main analysis device 200 via the analyzing subject DB 30. Due to this configuration, the main analysis unit 210 according to the main analysis device 200 described later can perform a process identical to that of the analysis-interference avoiding method executed by the preliminary analysis unit 131.

(Determination Unit 132)

The determination unit 132 determines whether a certain sample is handled as a subject for a main analysis based on information obtained by the preliminary analysis unit 131. Specifically, the determination unit 132 determines whether the sample is handled as a subject for a main analysis process based on determination criteria included in an execution log obtained by a preliminary analysis, such as whether the sample has been executed without any error and whether the sample is still performing communication between an external server.

First, a determination process performed by the determination unit 132 when a preliminary analysis is performed in a closed environment is described. In a closed environment, the determination unit 132 performs a determination based on information related to data transmission from a sample. Specifically, the determination unit 132 performs a determination based on the closed-environment execution log table 122 illustrated in FIG. 4.

As for samples having an error in all the execution environments used for a preliminary analysis, it is obvious that, when a main analysis is performed, these samples have an error at the time execution and the analysis cannot be performed, and thus the determination unit 132 determines that these samples are not handled as subjects for a main analysis. As for samples that are operated but have not generated any data transmission, the determination unit 132 deems that these samples do not contribute to creation of a blacklist, and determines that these samples are not handled as subjects for a main analysis. As for samples in which a behavior of data transmission can be confirmed but there is no communication related to a direct designation of an IP address, and in which an error with respect to all DNS queries is generated, the determination unit 132 determines that these samples are not handled as subjects for a main analysis. As described above, as for whether DNS queries can be made, it is possible to confirm it by checking whether a name resolution can be made separately in an environment where samples can be connected to the Internet after a preliminary analysis is finished.

The determination unit 132 then determines that samples having been determined to be handled as subjects for a main analysis based on the determination criteria described above are subjects for a main analysis.

Subsequently, a determination process performed by the determination unit 132 when a preliminary analysis is performed in an open environment is described. In an open environment, the determination unit 132 performs a determination based on information related to communication from a sample. Specifically, the determination unit 132 performs a determination based on the open-environment execution log table 123 illustrated in FIG. 5.

Similarly to the case in a closed environment, the determination unit 132 determines that samples having an error in all the execution environments used for a preliminary analysis are not handled as subjects for a main analysis. The determination unit 132 also determines that samples that are operated but have not generated any data transmission are not handled as subjects for a main analysis. Further, the determination unit 132 determines that samples in which a behavior of communication can be confirmed but an error is generated in all elements of communication are not handled as subjects for a main analysis. As a result of the above determination, the determination unit 132 determines that samples that do not correspond to the those described above as subject samples for a main analysis.

The determination unit 132 then sends information related to samples having been determined as subjects for a main analysis to the designation unit 133 in order to cause the designation unit 133 to designate the priority of analyses.

(Designation Unit 133)

The designation unit 133 designates the order of main analysis processes with respect to the samples having been determined by the determination unit 132 as subjects for a main analysis process, based on information obtained by the preliminary analysis unit 131. In other words, the designation unit 133 decides the order of analyzing samples that are subjects for a main analysis.

When the priority with respect to samples is designated, the designation unit 133 first accesses the analyzing subject DB 30 to obtain information of unanalyzed samples. Thereafter, the designation unit 133 designates the order of performing a main analysis with respect to the obtained unanalyzed samples and samples to be analyzed that are newly designated as subjects for a main analysis, based on the date and time of registering the samples or the number of communication counterparts as determination criteria. That is, the designation unit 133 registers information related to the new analyzing subject samples in the analyzing subject DB 30, and recalculates the priority of analyzing the unanalyzed samples originally registered in the analyzing subject DB 30.

In the calculation of the analyzing priority, the determination unit 133 prioritizes samples having newer date and time of sample registration. Further, as for samples having the same registration date and time, the designation unit 133 designates the priority in ascending order so that samples having a larger number of communication counterparts are prioritized. At this time, the designation unit 133 can eliminate samples having been registered for a time period that is longer than a predetermined time period since the registration thereof. This elimination indicates that, as for these samples, the necessity for performing a main analysis thereof is less because, for example, the possibility of these samples conducting malignant communication is low or the possibility that some countermeasures have already been taken against these samples.

In a case where the number of communication counterparts is used as the determination criteria, when a preliminary analysis is performed in a closed environment, the designation unit 133 handles the number of communication counterparts in which malware has a behavior of performing communication as the criteria, and when a preliminary analysis is performed in an open environment, the designation unit 133 handles the number of communication counterparts with respect to communication established by malware as the criteria. Specifically, when a preliminary analysis is performed in a closed environment, the designation unit 133 designates the priority of analyzing samples having a large "number of communication counterparts" illustrated in FIG. 4 to be higher. In this case, for example, the number of communication counterparts is the number of IP addresses of communication counterparts. In the example of FIG. 4, because the number of communication counterparts of the malware M011 is "23" whereas the number of communication counterparts of malware M012 is "18", in a comparison of the numbers of communication counterparts, the designation unit 133 designates the priority of the malware M011 higher.

Meanwhile, when a preliminary analysis has been performed in an open environment, the designation unit 133 designates the analyzing priority of samples having a large "number of communication counterparts in which response is received" illustrated in FIG. 5 higher. In the example of FIG. 5, because the number of communication counterparts in which response is received is "17" as for the malware M021, whereas the number of communication counterparts in which response is received is "13" as for the malware M022, in a comparison of the numbers of communication counterparts in which response is received, the designation unit 133 designates the priority of the malware M021 higher.

In the preliminary analysis performed by the preliminary analysis unit 131, by executing a sample in a plurality of execution environments in which an OS, a library, and an application to be installed in a terminal in which the sample is executed are arbitrarily combined with one another, there is a case where the number of communication counterparts in communication transmitted from the sample is obtained for each of the execution environments. In this case, the designation unit 133 designates the order of analyzing malware corresponding to the largest number of communication counterparts, among the numbers of communication counterparts obtained by the preliminary analysis unit 131 in each of the execution environments obtained. That is, when the number of communication counterparts is changed according to the corresponding execution environment in the same sample, the largest number of communication counterparts is the determination criteria for designating the order.

Subsequently, the designation unit 133 registers samples in the analyzing subject DB, while including the designated priority. At this time, with the respective samples, the designation unit 133 registers information related to an execution environment when an execution log having the highest priority is created. In this manner, samples handled as subjects for a main analysis are prioritized and selected by the preliminary analysis device 100, and information related to an execution environment suitable for analyzing these samples is registered in the analyzing subject DB 30. Due to this configuration, the malware analysis system 1 can effectively proceed a main analysis.

(Analyzing Subject DB 30)

The analyzing subject DB 30 is realized by, for example, a semiconductor memory device such as a RAM or a flash memory, or a storage device such as a hard disk or an optical disk. Information related to samples having been determined as subjects for a main analysis is stored in the analyzing subject DB 30. FIG. 6 illustrates an example of the analyzing subject DB 30 according to the present embodiment. As illustrated in FIG. 6, the analyzing subject DB 30 includes items such as "malware identifier", "priority", "number of communication counterparts", and "registration date and time".

The "malware identifier" indicates identification information for identifying malware. The "priority" indicates the order of actual analyses designated by the designation unit 133. The "number of communication counterparts" indicates the number of communication counterparts observed by a preliminary analysis. The "registration date and time" indicates the date and time when a sample is registered in a malware sharing site and the like for the first time. In other words, the registration date and time indicates the date and time when the sample is recognized (found) as malware.

That is, in FIG. 6, as an example of information stored in the analyzing subject DB 30, there is illustrated an example in which, as for malware identified by malware M043, the priority thereof is about "1", the number of communication counterparts thereof is "135", and the registration date and time thereof is "2015/1/23 17:10:15".

The "number of communication counterparts" in FIG. 6 can be replaced as "number of communication counterparts in which response is received". Further, although not illustrated in FIG. 6, in the analyzing subject DB 30, information attached to malware and information related to an execution environment used for a preliminary analysis can be stored.

(Main Analysis Device 200)

The main analysis device 200 according to the present embodiment is described next. As illustrated in FIG. 1, the main analysis device 200 includes the main analysis unit 210 and the analysis log DB 220.

The main analysis unit 210 performs a dynamic analysis (a main analysis) on samples in the analyzing subject DB 30 in order of priority in descending order. In this case, the main analysis unit 210 performs a dynamic analysis on the samples based on execution environment information stored in the analyzing subject DB 30. The main analysis unit 210 can not only simply perform an analysis with the same conditions as a preliminary analysis, but also combine known analysis methods such as a taint analysis. The analysis log DB 220 stores an analysis log obtained when the main analysis unit 210 performs a main analysis on samples. Due to this configuration, the main analysis device 200 can create a so-called "blacklist" with respect to the samples.

[Process Procedure]

Next, with reference to FIGS. 7 to 10, a procedure of the analysis process performed by the preliminary analysis device 100 described above is described.

(Preliminary Analysis Process)

Figure 7:
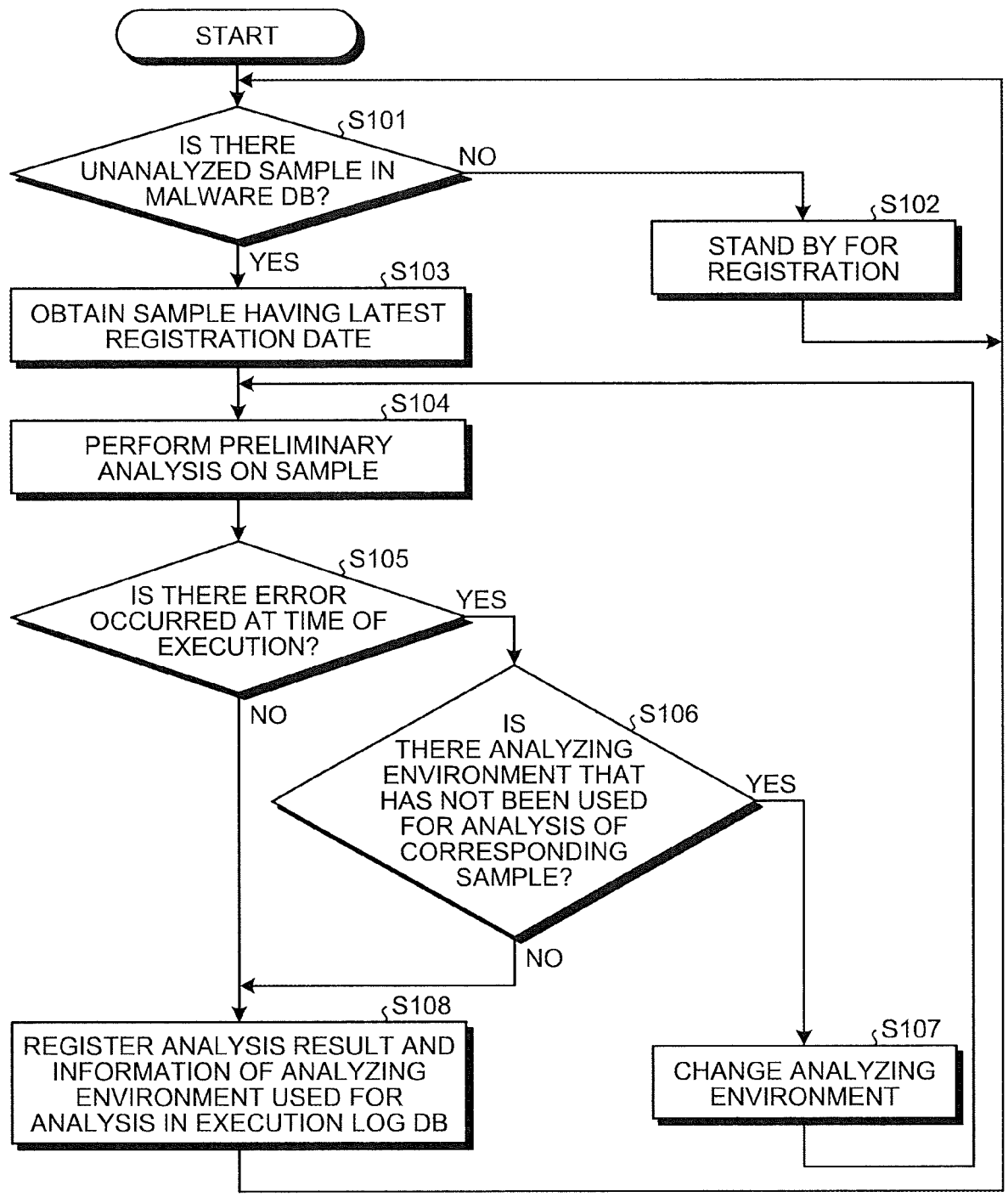
FIG. 7 is a flowchart illustrating a preliminary analysis process procedure according to the embodiment.

First, with reference to FIG. 7, a preliminary analysis process procedure performed by the preliminary analysis unit 131 is described. FIG. 7 is a flowchart illustrating a preliminary analysis process procedure according to the present embodiment.

As illustrated in FIG. 7, the preliminary analysis unit 131 determines whether there is any unanalyzed sample in the malware DB 20 (Step S101). When there is no unanalyzed sample (NO at Step S101), the preliminary analysis unit 131 stands by for a new registration (Step S102).

Meanwhile, when there are unanalyzed samples (YES at Step S101), the preliminary analysis unit 131 obtains a sample having the latest registration date among the unanalyzed samples (Step S103). Thereafter, the preliminary analysis unit 131 performs a preliminary analysis on the obtained sample (Step S104). First, the preliminary analysis unit 131 executes the sample and determines whether there is any error occurred at the time of execution (Step S105).

When there is an error occurred at the time of execution (YES at Step S101), the preliminary analysis unit 131 further determines whether there is any analyzing environment that has not been used for an analysis of the sample (Step S106), and when there is such an analyzing environment (YES at Step S106), the preliminary analysis unit 131 changes the analyzing environment (Step S107), and a preliminary analysis is performed again on the sample (Step S104). The analyzing environment means information including an execution environment of an OS and the like in which malware is executed or a network environment such as a closed environment or an open environment.

Meanwhile, when there is no error occurred at the time of execution (NO at Step S105), and when there is no analyzing environment that has not been used for the analysis of the sample (NO at Step S106), the analysis result and information of the analyzing environment used for the analysis are registered in the execution log DB 121 (Step S108). The preliminary analysis unit 131 repeatedly performs the process described above.

(Determination Process in Closed Environment)

Figure 8:
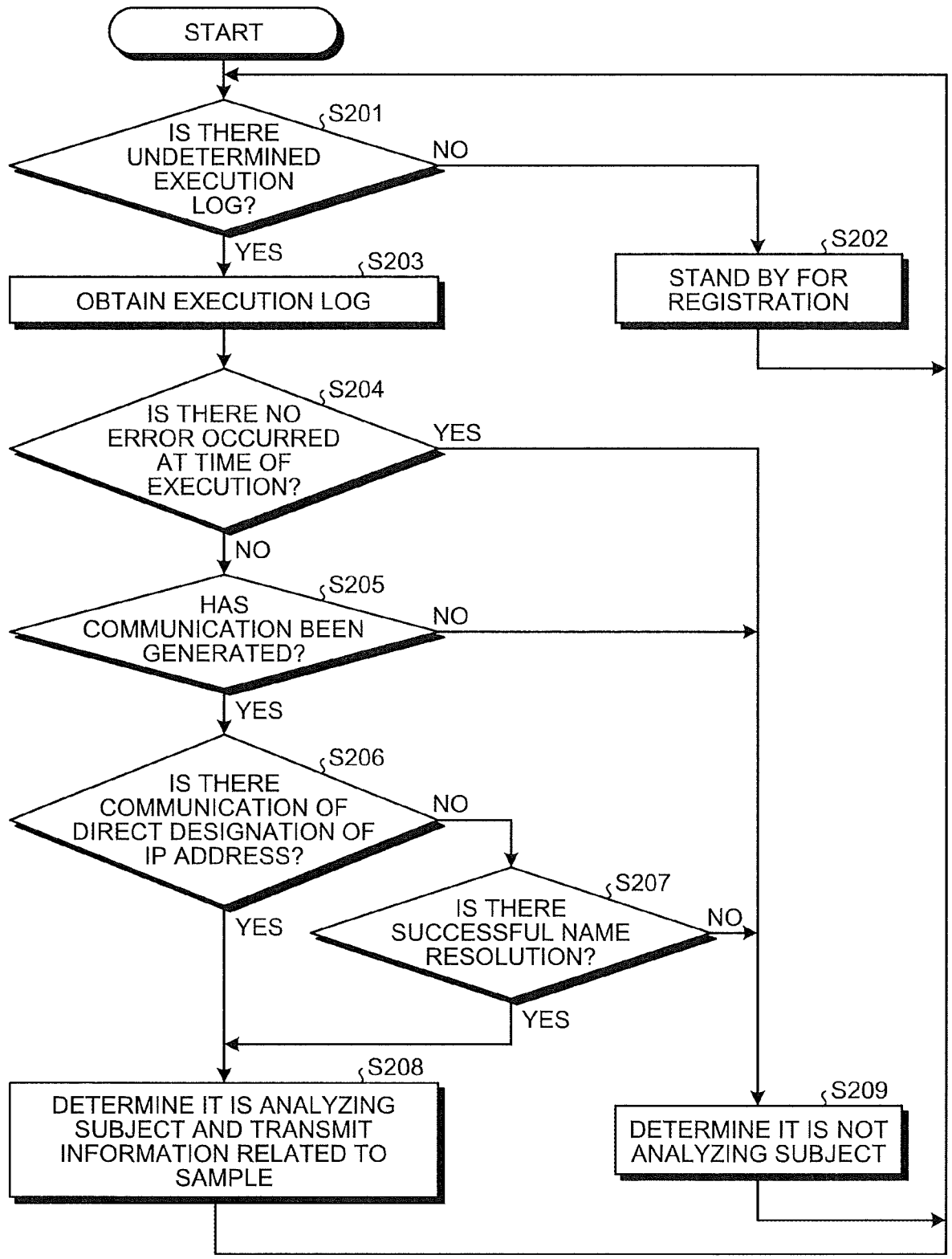
FIG. 8 is a flowchart illustrating a determination process procedure in a closed environment according to the embodiment.

Next, with reference to FIG. 8, a determination process procedure performed by the determination unit 132 in a closed environment is described. FIG. 8 is a flowchart illustrating a determination process procedure in the closed environment according to the present embodiment.

As illustrated in FIG. 8, the determination unit 132 determines whether there is any undetermined execution log in the execution log DB 121 (Step S201). When there is no undetermined execution log (NO at Step S201), the determination unit 132 stands by for a new registration of an execution log (Step S202).

Meanwhile, when there is an undetermined execution log (YES at Step S201), the determination unit 132 obtains an undetermined execution log as a subject for a determination process (Step S203). Subsequently, the determination unit 132 refers to the execution log and determines whether there is any error occurred at the time of execution (Step S204). When there is an error occurred at the time of execution (YES at Step S204), the determination unit 132 deems that it is not necessary to perform a main analysis on the sample related to the execution log, and determines that the sample is not an analyzing subject (Step S209).

Meanwhile, when there is no error occurred at the time of execution (NO at Step S204), the determination unit 132 determines whether any communication has been generated in the execution of the subject (that is, whether a behavior of data transmission has been confirmed) (Step S205). When any communication is not generated (NO at Step S205), the determination unit 132 deems that it is not necessary to perform a main analysis on the sample related to the execution log, and determines that the sample is not an analyzing subject (Step S209).

Meanwhile, when communication has been generated (YES at Step S205), the determination unit 132 determines whether there is any communication of a direct designation of an IP address among all elements of communication (Step S206). When there is no communication of a direct designation of an IP address (NO at Step S206), the determination unit 132 further determines whether there is any successful name resolution (Step S207). When there is no successful name resolution (NO at Step S207), the determination unit 132 deems that it is not necessary to perform a main analysis on the subject related to the execution log, and determines that the sample is not an analyzing subject (Step S209).

Meanwhile, when there is communication of a direct designation of an IP address (YES at Step S206), and when there is a successful name resolution (YES at Step S207), the determination unit 132 deems that it is necessary to perform a main analysis on the sample related to the execution log, determines that the sample is an analyzing subject, and sends information related to the sample to the designation unit 133 (Step S208). The determination unit 132 repeatedly performs the process described above.

(Determination Process in Open Environment)

Figure 9:
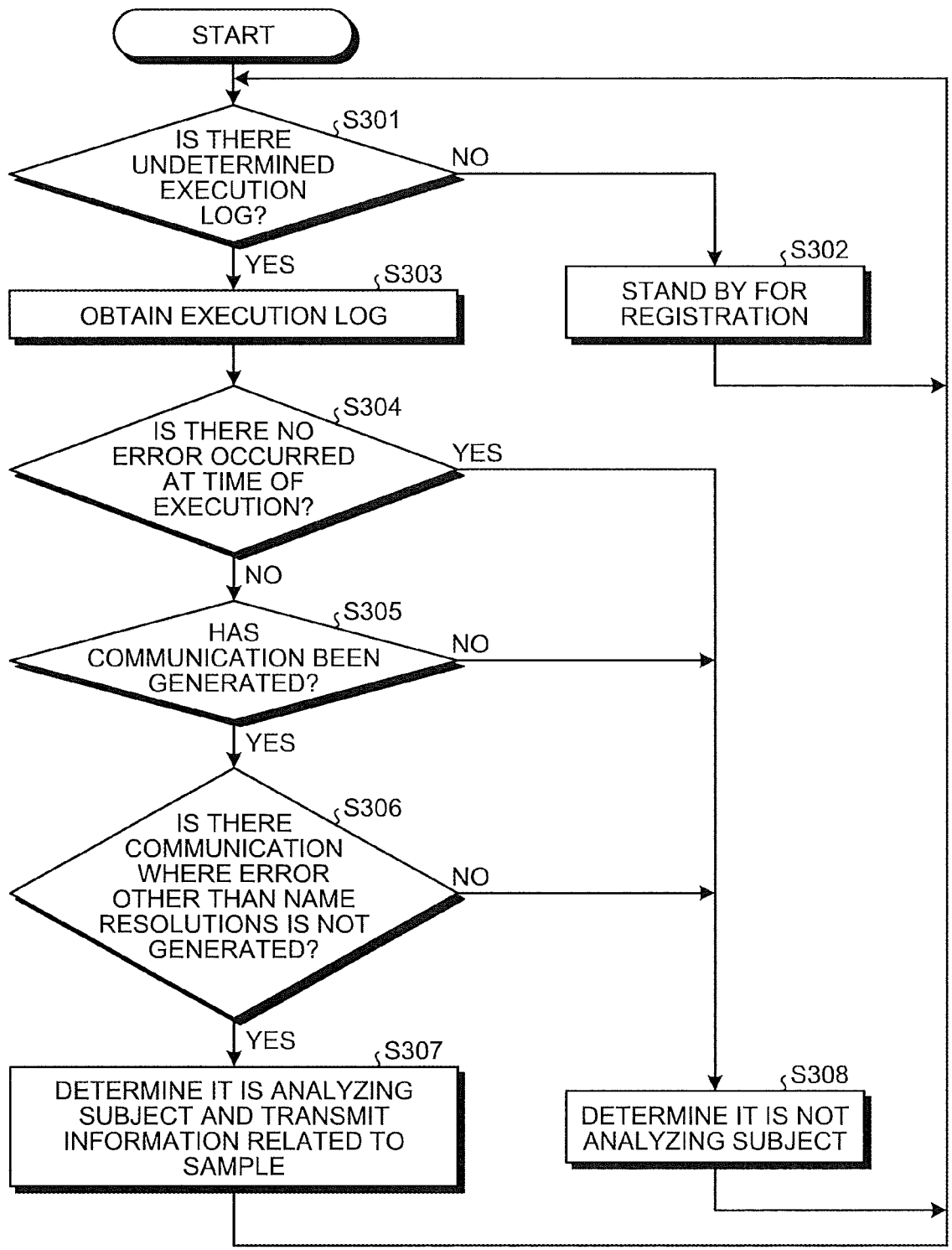
FIG. 9 is a flowchart illustrating a determination process procedure in an open environment according to the embodiment.

Next, with reference to FIG. 9, a determination process procedure performed by the determination unit 132 in an open environment is described. FIG. 9 is a flowchart illustrating a determination process procedure in an open environment according to the present embodiment. Processes at Steps S301 to S305 in FIG. 9 correspond to the processes at Steps S201 to S205 in FIG. 8, and thus explanations thereof are omitted.

In FIG. 9, the determination unit 132 further determines, as for an execution log indicating that communication is generated (YES at Step S305), whether there is any communication where any error is not generated other than name resolutions (Step S306). This process is performed because even when a name resolution alone is successful, if communication between a subject and an obtained IP address is not successful, it is not possible to extract, after performing a main analysis, a candidate that should be listed on a blacklist related to samples. That is, the above process is performed because even when a name resolution is successful, if a server itself as a communication counterpart is not operated (there is no response), any basis for listing candidates on the blacklist cannot be obtained.

When there is no communication where any error is not generated other than name resolutions (NO at Step S306), the determination unit 132 deems that it is not necessary to perform a main analysis on the sample related to the execution log, and determines that the sample is not an analyzing subject (Step S308).

Meanwhile, when there is communication where any error is not generated other than name resolutions (YES at Step S306), the determination unit 132 deems that it is necessary to perform a main analysis on the sample related to the execution log, determines that the sample is an analyzing subject, and sends information related to the sample to the designation unit 133 (Step S307). The determination unit 132 repeatedly performs the process described above.

(Designation Process)

Figure 10:
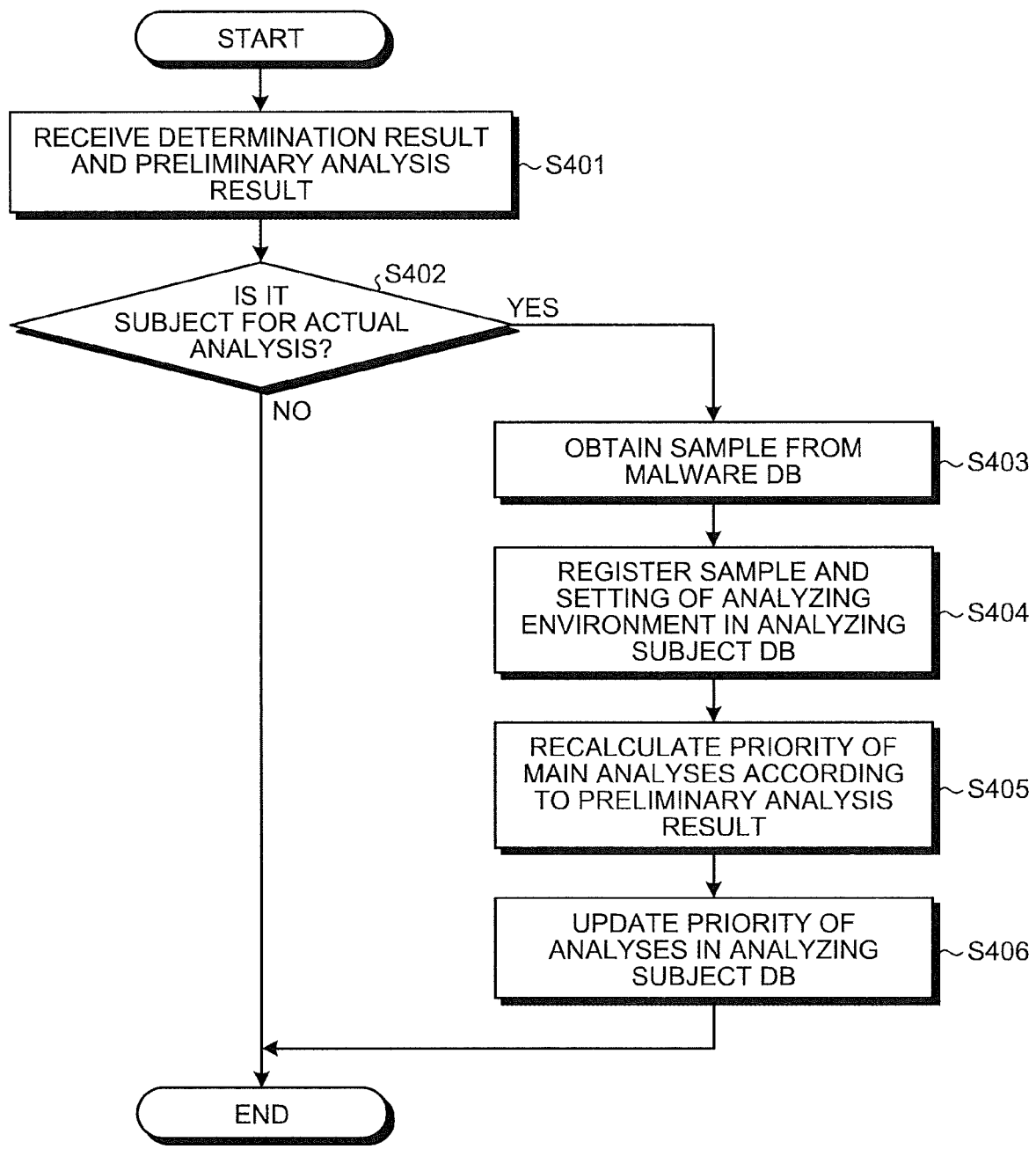
FIG. 10 is a flowchart illustrating a designation process procedure according to the embodiment.

Next, with reference to FIG. 10, a process procedure performed by the designation unit 133 to designate the priority in a main analysis with respect to a sample is described. FIG. 10 is a flowchart illustrating a designation process procedure according to the present embodiment.

As illustrated in FIG. 10, the designation unit 133 receives a determination result and a preliminary analysis result from the determination unit 132 (Step S401). Subsequently, the designation unit 133 determines whether the sample is a subject for a main analysis (Step S402). When the sample is not a subject for a main analysis (NO at Step S402), the process performed by the designation unit 133 is finished.

Meanwhile, when the sample is a subject for a main analysis (YES at Step S402), the designation unit 133 specifies a sample that has undergone a preliminary analysis, and obtains the sample from the malware DB 20 (Step S403). Subsequently, as for the obtained sample, the designation unit 133 registers the sample and setting of the analyzing environment in the preliminary analysis in the analyzing subject DB 30 (Step S404).

Thereafter, the designation unit 133 includes newly registered samples in the analyzing subject DB 30, and, as for the samples in the analyzing subject DB 30, the priority of actual analyses is recalculated according to a preliminary analysis result (Step S405). In this case, the designation unit 133 designates the priority based on the date and time of registering these samples as determination criteria. That is, the designation unit 133 sets the priority higher as for samples having newer registration date and time. Further, as for samples having the same registration date and time, the designation unit 133 designates the priority in such an order that samples having a larger number of communication counterparts are prioritized.

Subsequently, the designation unit 133 updates the priority of actual analyses in the analyzing subject DB 30 (Step S406). Due to this process, the designation process performed by the designation unit 133 is finished.

[Modification]

In the embodiment described above, there has been explained that, by performing a dynamic analysis on malware in a closed environment or an open environment, the malware analysis system 1 selects a sample on which a main analysis is performed based on information related to communication generated from the malware.

In this modification, the malware analysis system 1 can determine whether a certain sample is a subject for a main analysis based on external information related to the sample. For example, the malware analysis system 1 performs a determination on a collected sample by using information attached to the sample. Specifically, the malware analysis system 1 can perform a determination such that, if the time point when the sample is registered in a sample sharing site and the like for the first time is older than a predetermined time point, the sample is determined not to be a subject for a main analysis. There is some type of malware that has been existing on the Internet since a very long time ago (for example, well over ten years ago) and still spreading. However, as for such type of malware, countermeasures are already taken as far as the network system is maintained normally, and it is assumed that the priority of performing a main analysis on such type of malware is not high. Therefore, if the time point when the sample is registered in a sample sharing site and the like is before a predetermined time point set in advance, the malware analysis system 1 determines that the sample is not a subject for a main analysis. Due to this configuration, without performing any particular process, the malware analysis system 1 can determine that such a sample is not a subject for a main analysis.

Further, the malware analysis system 1 can select a sample by using information related to the number of people who have posted information for being registered in a sample sharing site and the like. In this case, the preliminary analysis unit 131 according to the malware analysis system 1 obtains the number of posters that is the number of people who have posted information related to malware in a sample sharing site and the like. The determination unit 132 determines whether the malware is handled as a subject for a main analysis based on the number of posters. Further, the designation unit 133 designates the analyzing order as for pieces of malware having been determined by the determination unit 132 as analyzing subjects, according to how many the number of posters is. Specifically, the malware analysis system 1 performs a determination such that samples with which the number of posters to a sample sharing site and the like is less than a predetermined number are preferentially determined as subjects for a main analysis. Malware conducting a targeted attack, that is, malware created to attack a specific organization, is assumed that the number of its finders is less as compared to a case of malware targeting many and unspecified number of people as it is spread in a mode such as an attached file of an e-mail. By utilizing such a tendency, the malware analysis system 1 obtains information related to the number of posters to a sample sharing site and the like, and determines that pieces of malware having a less number of posters are preferentially set to be subjects for a main analysis. In this manner, by preferentially setting samples having a less number of posters to be subjects for a main analysis, the malware analysis system 1 can perform a main analysis preferentially on samples having a higher possibility of being samples used for a targeted attack, thereby creating a blacklist related to the samples.

[Effect]

As described above, the preliminary analysis device 100 according to the present embodiment includes the preliminary analysis unit 131 that obtains information related to communication transmitted from malware by executing malware obtained as a candidate for an analyzing subject, the determination unit 132 that determines whether the malware is determined to be an analyzing subject based on the information obtained by the preliminary analysis unit 131, and the designation unit 133 that designates the analyzing order with respect to malware having been determined by the determination unit 132 as an analyzing subject based on the information obtained by the preliminary analysis unit 131.

As described above, the malware analysis system 1 according to the present embodiment performs a preliminary analysis process on pieces of malware, and determines whether these pieces of malware are subjects for a main analysis based on the result of a preliminary analysis. Further, the malware analysis system 1 designates the priority of processes with respect to pieces of malware determined to be subjects for a main analysis. Due to this configuration, the malware analysis system 1 can effectively select malware on which a main analysis process is desirably performed.

Further, when malware is executed in a closed environment that is an environment in which malware and an external communication network (for example, the Internet) are disconnected from each other, the preliminary analysis unit 131 obtains, as information related to communication transmitted from the malware, information related to the presence of a direct designation of an IP address as a communication counterpart or the presence of communication where a name resolution is successful. Subsequently, when the information obtained by the preliminary analysis unit 131 includes any of a direct designation of an IP address or communication where a name resolution is successful, the determination unit 132 determines that the malware is an analyzing subject. Thereafter, the designation unit 133 designates the order of analyzing the malware according to the number of communication counterparts specified by an IP address or communication where a name resolution is successful.

In this manner, by executing malware in a closed environment, the malware analysis system 1 according to the present embodiment obtains information related to communication of the malware without being known by the attacker. Due to this configuration, the malware analysis system 1 can effectively proceed an analysis on the malware.

Further, when malware is executed in an open environment that is an environment in which malware and an external communication network can be connected to each other, the preliminary analysis unit 131 obtains, as information related to communication transmitted from the malware, information related to the presence of communication where a response other than errors has been obtained. Subsequently, when the information obtained by the preliminary analysis unit 131 includes communication where a response other than errors has been obtained, the determination unit 132 determines that the malware is an analyzing subject. The designation unit 133 then designates the order of analyzing the malware according to the number of communication counterparts in which a response other than errors has been obtained.

In this manner, by executing malware in an open environment, the malware analysis system 1 according to the present embodiment can perform an analysis while assuming the environment in which the malware is actually operated.

In this case, the malware can be determined as a subject for a main analysis based on a fact that communication is established in a preliminary analysis, and thus it is possible to eliminate waste in a main analysis process such as performing a main analysis on malware that does not actually perform any communication. As a result, the malware analysis system 1 can effective proceed an analysis on the malware.

Further, in a terminal in which malware is executed, by executing the malware in a plurality of execution environments in which an OS, a library, and an application to be installed in the terminal are arbitrarily combined with one another, the preliminary analysis unit 131 can obtain the number of communication counterparts in communication transmitted from the malware for each of the execution environments. Subsequently, the designation unit 133 designates the order of analyzing the malware according to the largest number of communication counterparts among the numbers of communication counterparts obtained by the preliminary analysis unit 131 for each of the execution environments.

In this manner, in the stage of a preliminary analysis, the malware analysis system 1 according to the present embodiment checks the operation of malware in various execution environments. That is, by obtaining information related to communication of the malware upon creation of an environment in which the possibility that the malware performing malignant communication is high, the malware analysis system 1 can appropriately determine malware on which a main analysis should be performed preferentially, thereby designating the priority. Further, because the malware analysis system 1 obtains, also in a main analysis, information related to an analyzing environment such as an execution environment, the efficiency of the main analysis process can be improved.

Further, as for malware to be handled as a processing subject, the preliminary analysis unit 131 obtains registration date and time that is the date and time when the malware is registered for the first time in a predetermined database (for example, a malware sharing site) in which pieces of malware are stored in an integrated manner via a communication network. Subsequently, the determination unit 132 determines whether the malware is handled as an analyzing subject based on the registration date and time. The designation unit 133 then designates the analyzing order of malware having newer registration date and time among pieces of malware having been determined by the determination unit 132 as analyzing subjects higher.

Due to this configuration, the malware analysis system 1 according to the present embodiment can appropriately select malware, such as newly found malware, on which an analysis should be performed preferentially. Further, the malware analysis system 1 can determine that malware having less necessity of countermeasures, such as malware having been registered in a malware sharing site since a very long time ago, is not a subject for a main analysis. Therefore, the malware analysis system 1 can effectively proceed an analysis process on malware.

Further, the preliminary analysis unit 131 obtains the number of posters that is the number of people who have posted information related to malware in a predetermined database. Subsequently, the determination unit 132 determines whether the malware is determined to be an analyzing subject based on the number of posters. The designation unit 133 then designates the analyzing order of pieces of malware having been determined by the determination unit 132 as analysis subjects according to how many the number of posters is. For example, the designation unit 133 designates the analyzing order of malware having a less number of posters higher.

As described above, in the malware analysis system 1 according to the present embodiment, by setting the number of posters of information to a malware sharing site and the like as criteria for designating the analyzing order, a main analysis can be performed preferentially on malware having a high risk such as malware used for a targeted attack.

(Configuration and the Like)

Respective constituent elements of the respective devices illustrated in the drawings are functionally conceptual, and are not necessarily configured physically as illustrated in the drawings. That is, specific modes of distribution and integration of the respective devices are not limited to those illustrated in the drawings, and a part or all of the devices can be configured while being functionally or physically distributed or integrated in an arbitrary unit according to various types of loads, use status, and the like. Further, a part or all of respective processing functions executed in the respective devices can be realized by a CPU and a program analyzed and executed in the CPU, or can be realized as hardware by a wired logic.

Among the respective processes described in the present embodiment, a part or all of the processes described as being performed automatically can be performed manually, or a part or all of the processes described as being performed manually can be performed automatically with a known method. In addition, information including the processing procedure, control procedure, specific names, and various types of data and parameters described in the specification or illustrated in the drawings can be arbitrarily changed unless otherwise specified.

(Program)

It is possible to create a program described in a computer-executable language that executes processes performed on the malware analysis system 1 according to the present embodiment. In this case, by executing the program on a computer, effects identical to those of the above embodiment can be achieved. Further, it is also possible to realize processes identical to those of the above embodiment by recording the program in a computer-readable recording medium, causing the computer to read the program recorded in the recording medium, and executing the program. An example of a computer that executes a malware analysis program realizing functions identical to those in the malware analysis system 1 is described below.

FIG. 11 is a diagram illustrating a computer that executes a malware analysis program. As illustrated in FIG. 11, a computer 1000 includes, for example, a memory 1010, a CPU (Central Processing Unit) 1020, a hard disk drive interface 1030, a disk drive interface 1040, a serial port interface 1050, a video adapter 1060, and a network interface 1070. These elements are connected to one another via a bus 1080.

The memory 1010 includes a ROM (Read Only Memory) 1011 and a RAM (Random Access Memory) 1012. The ROM 1011 stores therein, for example, a boot program such as a BIOS (Basic Input Output System). The hard disk drive interface 1030 is connected to a hard disk drive 1090. The disk drive interface 1040 is connected to a disk drive 1041. For example, a detachable storage medium such as a magnetic disk or an optical disk is inserted into the disk drive 1041. For example, a mouse 1110 and a keyboard 1120 are connected to the serial port interface 1050. For example, a display 1130 is connected to the video adaptor 1060.

As illustrated in FIG. 11, the hard disk drive 1090 stores therein, for example, an OS 1091, an application program 1092, a program module 1093, and program data 1094. Respective pieces of information described in the above embodiment are stored in the hard disk drive 1090 or the memory 1010, for example.

The malware analysis program is stored in the hard disk drive 1090 as, for example, a program module in which commands to be executed by the computer 1000 are described. Specifically, a program module in which respective processes performed by the preliminary analysis device 100 and the main analysis device 200 described in the above embodiment are described is stored in the hard disk drive 1090.

Data used for information processing performed by the malware analysis program is, for example, stored in the hard disk drive 1090 as program data. The CPU 1020 reads out the program module 1093 and the program data 1094 stored in the hard disk drive 1090 on the RAM 1012 as necessary, and performs the respective procedures described above.

The program module 1093 and the program data 1094 related to the malware analysis program are not limited to those stored in the hard disk drive 1090. For example, the program module 1093 and the program data 1094 can be stored in a detachable storage medium and read out by the CPU 1020 via a device such as the disk drive 1041. Alternatively, the program module 1093 and the program data 1094 related to the malware analysis program can be stored in another computer being connected via a network such as a LAN (Local Area Network) or a WAN (Wide Area Network) and read out by the CPU 1020 via the network interface 1070.

REFERENCE SIGNS LIST 1 malware analysis system
10 malware collection system
20 malware DB
30 analyzing subject DB
100 preliminary analysis device
110 IF unit
120 storage unit
121 execution log DB
122 closed-environment execution log table
123 open-environment execution log table
130 control unit
131 preliminary analysis unit
132 determination unit
133 designation unit
200 main analysis device
210 main analysis unit
220 analysis log DB

The invention claimed is:

1. A malware analysis system comprising:
processing circuitry configured to
    execute malware obtained as a candidate for an analyzing subject to obtain information related to communication transmitted from the obtained malware, the obtained malware being initially received from a malware collection system that collects malware from a communications network;
    determine whether the obtained malware is handled as an analyzing subject based on the obtained information; and
    designate an analyzing order with respect to the determined malware handled as an analyzing subject according to a number of communication counterparts related to communication generated by the obtained malware having been determined as an analyzing subject based on the obtained information and store the designated analyzing order in a database which is configured to be accessed by the processing circuitry for performing a main analysis process on the determined malware handled as an analyzing subject, according to the designated analyzing order, for creating a blacklist, wherein
    when the obtained malware is executed in a closed environment that is an environment in which the obtained malware and an external communication network are disconnected from each other, the processing circuitry obtains information related to presence of a direct designation of an IP address as a communication counterpart or presence of communication where a name resolution is successful, as information related to communication transmitted from the obtained malware,
when the information obtained by the processing circuitry includes any of a direct designation of an IP address or communication where a name resolution is successful, the processing circuitry determines that the obtained malware is an analyzing subject, and the processing circuitry designates the analyzing order of the malware determined as an analyzing subject according to number of communication counterparts specified by the communication where a name resolution is successful.

2. A malware analysis system comprising:
processing circuitry configured to
execute malware obtained as a candidate for an analyzing subject to obtain information related to communication transmitted from the obtained malware, the obtained malware being initially received from a malware collection system that collects malware from a communications network;
determine whether the obtained malware is handled as an analyzing subject based on the obtained information; and
designate an analyzing order with respect to the determined malware handled as an analyzing subject according to a number of communication counterparts related to communication generated by the obtained malware having been determined as an analyzing subject based on the obtained information and store the designated analyzing order in a database which is configured to be accessed by the processing circuitry for performing a main analysis process on the determined malware handled as an analyzing subject, according to the designated analyzing order, for creating a blacklist, wherein
when the obtained malware is executed in an open environment that is an environment in which the obtained malware and an external communication network can be connected to each other, the processing circuitry obtains information related to presence of communication where a response other than errors is obtained, as information related to communication transmitted from the obtained malware,
when the information obtained by the processing circuitry includes communication where a response other than errors is obtained, the processing circuitry determines that the obtained malware is an analyzing subject, and
the processing circuitry designates the analyzing order of the malware determined as an analyzing subject according to the number of communication counterparts in which a response other than errors is obtained.

3. A malware analysis system comprising:
processing circuitry configured to
execute malware obtained as a candidate for an analyzing subject to obtain information related to communication transmitted from the obtained malware, the obtained malware being initially received from a malware collection system that collects malware from a communications network;
determine whether the obtained malware is handled as an analyzing subject based on the obtained information; and
designate an analyzing order with respect to the determined malware handled as an analyzing subject according to a number of communication counterparts related to communication generated by the obtained malware having been determined as an analyzing subject based on the obtained information and store the designated analyzing order in a database which is configured to be accessed by the processing circuitry for performing a main analysis process on the determined malware handled as an analyzing subject, according to the designated analyzing order, for creating a blacklist,
wherein
in a terminal in which the obtained malware is executed, by executing the obtained malware in a plurality of environments in which an OS, a library, and an application to be installed in the terminal are arbitrarily combined with one another, the processing circuitry obtains number of communication counterparts in communication transmitted from the obtained malware for each of the plurality of environments, and
the processing circuitry designates the analyzing order of the determined malware handled as an analyzing subject according to a largest number of communication counterparts among the number of communication counterparts obtained by the processing circuitry for each of the plurality of environments.

4. A malware analysis system comprising:
processing circuitry configured to
execute malware obtained as a candidate for an analyzing subject to obtain information related to communication transmitted from the obtained malware, the obtained malware being initially received from a malware collection system that collects malware from a communications network;
determine whether the obtained malware is handled as an analyzing subject based on the obtained information; and
designate an analyzing order with respect to the determined malware handled as an analyzing subject according to a number of communication counterparts related to communication generated by the obtained malware having been determined as an analyzing subject based on the obtained information and store the designated analyzing order in a database which is configured to be accessed by the processing circuitry for performing a main analysis process on the determined malware handled as an analyzing subject, according to the designated analyzing order, for creating a blacklist, wherein
the processing circuitry obtains, as for the determined malware handled as an analyzing subject, registration date and time that is date and time when the determined malware handled as an analyzing subject is registered for first time in a predetermined database in which pieces of the determined malware handled as an analyzing subject are stored in an integrated manner via the communication network, the processing circuitry determines whether the obtained malware is handled as an analyzing subject based on the registration date and time, and the processing circuitry designates the analyzing order of the determined malware handled as an analyzing subject having a newer one of the registration date and time higher, among pieces of malware having been determined by the determination unit as analyzing subjects.

5. A malware analysis system comprising:
processing circuitry configured to
execute malware obtained as a candidate for an analyzing subject to obtain information related to communication transmitted from the obtained malware, the obtained malware being initially received from a malware collection system that collects malware from a communications network;
determine whether the obtained malware is handled as an analyzing subject based on the obtained information; and
designate an analyzing order with respect to the determined malware handled as an analyzing subject according to a number of communication counterparts related to communication generated by the obtained malware having been determined as an analyzing subject based on the obtained information and store the designated analyzing order in a database which is configured to be accessed by the processing circuitry for performing a main analysis process on the to the determined malware handled as an analyzing subject, according to the designated analyzing order, for creating a blacklist, wherein
the processing circuitry obtains, as for the determined malware handled as a processing subject, number of posters that is number of people having posted information related to the determined malware handled as a processing subject malware in a predetermined database in which pieces of the determined malware handled as a processing subject malware are stored in an integrated manner via the communications network, the processing circuitry determines whether the obtained malware is handled as an analyzing subject based on the number of posters, and the pieces of malware having been determined by the processing circuitry as analyzing subjects, the processing circuitry designates the analyzing order according to the number of posters.

6. A malware analysis method, implemented by a malware analysis system, comprising:
a preliminary analyzing step of executing malware obtained as a candidate for an analyzing subject and obtaining information related to communication transmitted from the obtained malware, the obtained malware being initially received from a malware collection system that collects malware from a communications network;
a determining step of determining whether the obtained malware is handled as an analyzing subject based on information obtained at the preliminary analyzing step; and
a designating step of designating an analyzing order with respect to the determined malware handled as an analyzing subject according to a number of communication counterparts related to communication generated by the malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist,
wherein
when the obtained malware is executed in a closed environment that is an environment in which the obtained malware and an external communication network are disconnected from each other, the method includes obtaining information related to presence of a direct designation of an IP address as a communication counterpart or presence of communication where a name resolution is successful, as information related to communication transmitted from the obtained malware,
when the information obtained includes any of a direct designation of an IP address or communication where a name resolution is successful, the method includes determining that the obtained malware is an analyzing subject, and
the method includes designating the analyzing order of the malware determined as an analyzing subject according to number of communication counterparts specified by the communication where a name resolution is successful.

7. A non-transitory computer-readable medium having stored a malware analysis program causing a computer to execute a process comprising:
a preliminary analyzing step of executing malware obtained as a candidate for an analyzing subject and obtaining information related to communication transmitted from the obtained malware, the obtained malware being initially received from a malware collection system that collects malware from a communications network;
a determining step of determining whether the obtained malware is handled as an analyzing subject based on information obtained at the preliminary analyzing step; and
a designating step of designating an analyzing order with respect to the determined malware handled as an analyzing subject according to a number of communication counterparts related to communication generated by the malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist,
wherein
when the obtained malware is executed in a closed environment that is an environment in which the obtained malware and an external communication network are disconnected from each other, the method includes obtaining information related to presence of a direct designation of an IP address as a communication counterpart or presence of communication where a name resolution is successful, as information related to communication transmitted from the obtained malware,
when the information obtained includes any of a direct designation of an IP address or communication where a name resolution is successful, the method includes determining that the obtained malware is an analyzing subject, and
the method includes designating the analyzing order of the malware determined as an analyzing subject according to number of communication counterparts specified by the communication where a name resolution is successful.

8. A malware analysis method, implemented by a malware analysis system, comprising:
a preliminary analyzing step of executing malware obtained as a candidate for an analyzing subject and obtaining information related to communication transmitted from the obtained malware, the obtained malware being initially received from a malware collection system that collects malware from a communications network;
a determining step of determining whether the obtained malware is handled as an analyzing subject based on information obtained at the preliminary analyzing step; and
a designating step of designating an analyzing order with respect to the determined malware handled as an analyzing subject according to a number of communication counterparts related to communication generated by the malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist,
wherein
when the obtained malware is executed in an open environment that is an environment in which the obtained malware and an external communication network can be connected to each other, the method includes obtaining information related to presence of communication where a response other than errors is obtained, as information related to communication transmitted from the obtained malware,
when the information obtained by the preliminary analysis step includes communication where a response other than errors is obtained, the method further includes determining that the obtained malware is an analyzing subject, and
the method includes designating the analyzing order of the malware determined as an analyzing subject according to the number of communication counterparts in which a response other than errors is obtained.

9. A malware analysis method, implemented by a malware analysis system, comprising:
a preliminary analyzing step of executing malware obtained as a candidate for an analyzing subject and obtaining information related to communication transmitted from the obtained malware, the obtained malware being initially received from a malware collection system that collects malware from a communications network;
a determining step of determining whether the obtained malware is handled as an analyzing subject based on information obtained at the preliminary analyzing step; and
a designating step of designating an analyzing order with respect to the determined malware handled as an analyzing subject according to a number of communication counterparts related to communication generated by the obtained malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist,
wherein
in a terminal in which the obtained malware is executed, by executing the obtained malware in a plurality of environments in which an OS, a library, and an application to be installed in the terminal are arbitrarily combined with one another, the method includes obtaining a number of communication counterparts in communication transmitted from the obtained malware for each of the plurality of environments, and
the method includes designating the analyzing order of the determined malware handled as an analyzing subject according to a largest number of communication counterparts among the number of communication counterparts obtained by the preliminary analysis step for each of the plurality of environments.

10. A malware analysis method, implemented by a malware analysis system, comprising:
a preliminary analyzing step of executing malware obtained as a candidate for an analyzing subject and obtaining information related to communication transmitted from the obtained malware, the obtained malware being initially received from a malware collection system that collects malware from a communications network;
a determining step of determining whether the obtained malware is handled as an analyzing subject based on information obtained at the preliminary analyzing step; and
a designating step of designating an analyzing order with respect to the determined malware handled as an analyzing subject according to a number of communication counterparts related to communication generated by the obtained malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist,
wherein
the method includes obtaining, as for the determined malware handled as an analyzing subject, registration date and time that is date and time when the determined malware is registered for first time in a predetermined database in which pieces of the determined malware handled as an analyzing subject are stored in an integrated manner via the communications network,
the method includes determining whether the obtained malware is handled as an analyzing subject based on the registration date and time, and
the method includes designating the analyzing order of the determined malware handled as an analyzing subject having a newer one of the registration date and time higher, among pieces of malware having been determined by the determination step as analyzing subjects.

11. A malware analysis method, implemented by a malware analysis system, comprising:
a preliminary analyzing step of executing malware obtained as a candidate for an analyzing subject and obtaining information related to communication transmitted from the obtained malware, the obtained malware being initially received from a malware collection system that collects malware from a communications network;
a determining step of determining whether the obtained malware is handled as an analyzing subject based on information obtained at the preliminary analyzing step; and
a designating step of designating an analyzing order with respect to the determined malware handled as an analyzing subject according to a number of communication counterparts related to communication generated by the obtained malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist, wherein the method includes obtaining, as for the determined malware handled as a processing subject, number of posters that is number of people having posted information related to the determined malware handled as a processing subject malware in a predetermined database in which pieces of the determined malware handled as a processing subject malware are stored in an integrated manner via a the communications network, the method includes determining whether the obtained malware is handled as an analyzing subject based on the number of posters, and the pieces of malware having been determined as analyzing subjects, the method includes designating the analyzing order according to the number of posters.

12. A non-transitory computer-readable medium having stored a malware analysis program causing a computer to execute a process comprising:

a preliminary analyzing step of executing malware obtained as a candidate for an analyzing subject and obtaining information related to communication transmitted from the obtained malware, the obtained malware being initially received from a malware collection system that collects malware from a communications network;

a determining step of determining whether the obtained malware is handled as an analyzing subject based on information obtained at the preliminary analyzing step; and a designating step of designating an analyzing order with respect to the determined malware handled as an analyzing subject according to a number of communication counterparts related to communication generated by the malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist, wherein when the obtained malware is executed in an open environment that is an environment in which the obtained malware and an external communication network can be connected to each other, the method includes obtaining information related to presence of communication where a response other than errors is obtained, as information related to communication transmitted from the obtained malware, when the information obtained by the preliminary analysis step includes communication where a response other than errors is obtained, the method further includes determining that the obtained malware is an analyzing subject, and the method includes designating the analyzing order of the malware determined as an analyzing subject according to the number of communication counterparts in which a response other than errors is obtained.

13. A non-transitory computer-readable medium having stored a malware analysis program causing a computer to execute a process comprising:

a preliminary analyzing step of executing malware obtained as a candidate for an analyzing subject and obtaining information related to communication transmitted from the obtained malware, the obtained malware being initially received from a malware collection system that collects malware from a communications network;

a determining step of determining whether the obtained malware is handled as an analyzing subject based on information obtained at the preliminary analyzing step; and a designating step of designating an analyzing order with respect to the determined malware handled as an analyzing subject according to a number of communication counterparts related to communication generated by the obtained malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist, wherein in a terminal in which the obtained malware is executed, by executing the obtained malware in a plurality of environments in which an OS, a library, and an application to be installed in the terminal are arbitrarily combined with one another, the method includes obtaining a number of communication counterparts in communication transmitted from the obtained malware for each of the plurality of environments, and the method includes designating the analyzing order of the determined malware handled as an analyzing subject according to a largest number of communication counterparts among the number of communication counterparts obtained by the preliminary analysis step for each of the plurality of environments.

14. A non-transitory computer-readable medium having stored a malware analysis program causing a computer to execute a process comprising:

a preliminary analyzing step of executing malware obtained as a candidate for an analyzing subject and obtaining information related to communication transmitted from the obtained malware, the obtained malware being initially received from a malware collection system that collects malware from a communications network;

a determining step of determining whether the obtained malware is handled as an analyzing subject based on information obtained at the preliminary analyzing step; and a designating step of designating an analyzing order with respect to the determined malware handled as an analyzing subject according to a number of communication counterparts related to communication generated by the obtained malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist, wherein the method includes obtaining, as for the determined malware handled as an analyzing subject, registration date and time that is date and time when the determined malware is registered for first time in a predetermined database in which pieces of the determined malware handled as an analyzing subject are stored in an integrated manner via the communications network, the method includes determining whether the obtained malware is handled as an analyzing subject based on the registration date and time, and the method includes designating the analyzing order of the determined malware handled as an analyzing subject having a newer one of the registration date and time higher, among pieces of malware having been determined by the determination step as analyzing subjects.

15. A non-transitory computer-readable medium having stored a malware analysis program causing a computer to execute a process comprising:

a preliminary analyzing step of executing malware obtained as a candidate for an analyzing subject and obtaining information related to communication transmitted from the obtained malware, the obtained malware being initially received from a malware collection system that collects malware from a communications network;

a determining step of determining whether the obtained malware is handled as an analyzing subject based on information obtained at the preliminary analyzing step; and a designating step of designating an analyzing order with respect to the determined malware handled as an analyzing subject according to a number of communication counterparts related to communication generated by the obtained malware having been determined at the determining step as an analyzing subject and storing the designated analyzing order in a database which is configured to be accessed by the malware analysis system for performing a main analysis process on the determined malware handled as an analyzing subject, according to the designated analyzing order, for creating a blacklist, wherein the method includes obtaining, as for the determined malware handled as a processing subject, number of posters that is number of people having posted information related to the determined malware handled as a processing subject malware in a predetermined database in which pieces of the determined malware handled as a processing subject malware are stored in an integrated manner via the communications network, the method includes determining whether the obtained malware is handled as an analyzing subject based on the number of posters, and the pieces of malware having been determined as analyzing subjects, the method includes designating the analyzing order according to the number of posters.

* * * * *